US011953686B2

(12) United States Patent
Held et al.

(10) Patent No.: US 11,953,686 B2
(45) Date of Patent: Apr. 9, 2024

(54) COMBINED BIREFRINGENT MATERIAL AND REFLECTIVE WAVEGUIDE FOR MULTIPLE FOCAL PLANES IN A MIXED-REALITY HEAD-MOUNTED DISPLAY DEVICE

(71) Applicant: Microsoft Technology Licensing, LLC, Redmond, WA (US)

(72) Inventors: Robert Thomas Held, Redmond, WA (US); Bernard Charles Kress, Redmond, WA (US); Ashley Saulsbury, Redmond, WA (US); Dmitry Reshidko, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 150 days.

(21) Appl. No.: 17/448,890

(22) Filed: Sep. 26, 2021

(65) Prior Publication Data
US 2023/0103091 A1  Mar. 30, 2023

(51) Int. Cl.
*G02B 27/01* (2006.01)
*G02B 27/28* (2006.01)
(Continued)

(52) U.S. Cl.
CPC ..... *G02B 27/0172* (2013.01); *G02B 27/0179* (2013.01); *G02B 27/288* (2013.01);
(Continued)

(58) Field of Classification Search
None
See application file for complete search history.

(56) References Cited

U.S. PATENT DOCUMENTS

| 10,948,712 B2 | 3/2021 | Lapstun |
| 2019/0285939 A1* | 9/2019 | Lee ..................... G02B 17/086 |
| 2020/0012090 A1* | 1/2020 | Lapstun ............... H04N 13/229 |

FOREIGN PATENT DOCUMENTS

| CN | 112051675 A | 12/2020 |
| WO | WO-2012175939 A1 * | 12/2012 ............. G02B 30/24 |
| WO | 2018106253 A1 | 6/2018 |

OTHER PUBLICATIONS

"International Search Report and Written Opinion Issued in PCT Application No. PCT/US22/038609", dated Nov. 2, 2022, 13 Pages.
(Continued)

*Primary Examiner* — Jwalant Amin
(74) *Attorney, Agent, or Firm* — Mark K. Young; Mark Young PC

(57) ABSTRACT

An optical combiner in a display system of a mixed-reality head-mounted display (HMD) device comprises a lens of birefringent material and a ferroelectric liquid crystal (FLC) modulator that are adapted for use with a reflective waveguide to provide multiple different focal planes on which holograms of virtual-world objects (i.e., virtual images) are displayed. The birefringent lens has two orthogonal refractive indices, ordinary and extraordinary, depending on the polarization state of the incident light. Depending on the rotation of the polarization axis by the FLC modulator, the incoming light to the birefringent lens is focused either at a distance corresponding to the ordinary refractive index or the extraordinary refractive index. Virtual image light leaving the birefringent lens is in-coupled to a see-through reflective waveguide which is configured to form an exit pupil for the optical combiner to enable an HMD device user to view the virtual images from the source.

18 Claims, 22 Drawing Sheets

(51) Int. Cl.
*G02F 1/29* (2006.01)
*G09G 3/00* (2006.01)

(52) U.S. Cl.
CPC ............ *G02F 1/294* (2021.01); *G09G 3/001* (2013.01); *G02B 2027/0127* (2013.01); *G02B 2027/0178* (2013.01); *G02B 2027/0187* (2013.01)

(56) References Cited

OTHER PUBLICATIONS

Zhan, et al., "Multifocal Displays: Review and Prospect", In Journal of Photonix, vol. 1, Issue 1, Mar. 30, 2020, 31 Pages.

* cited by examiner

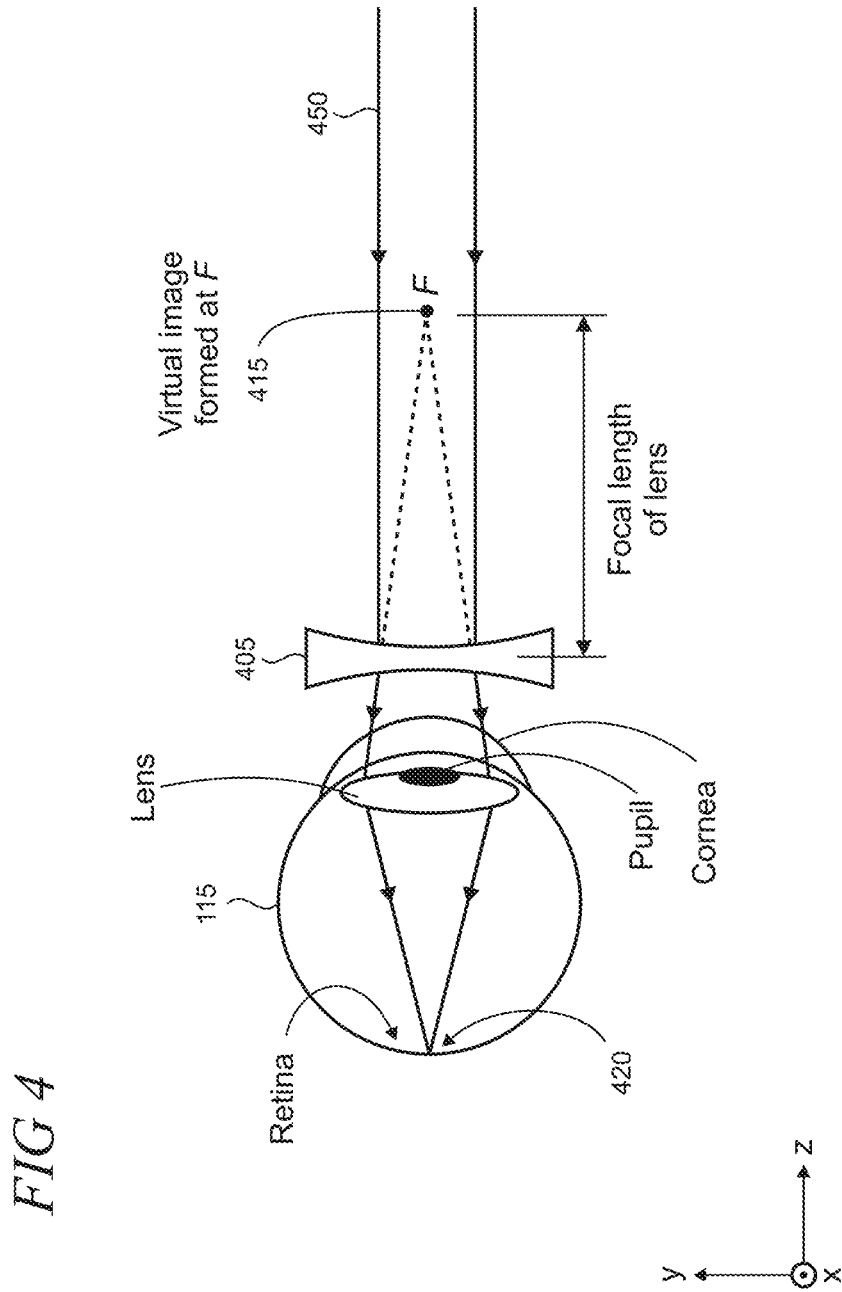

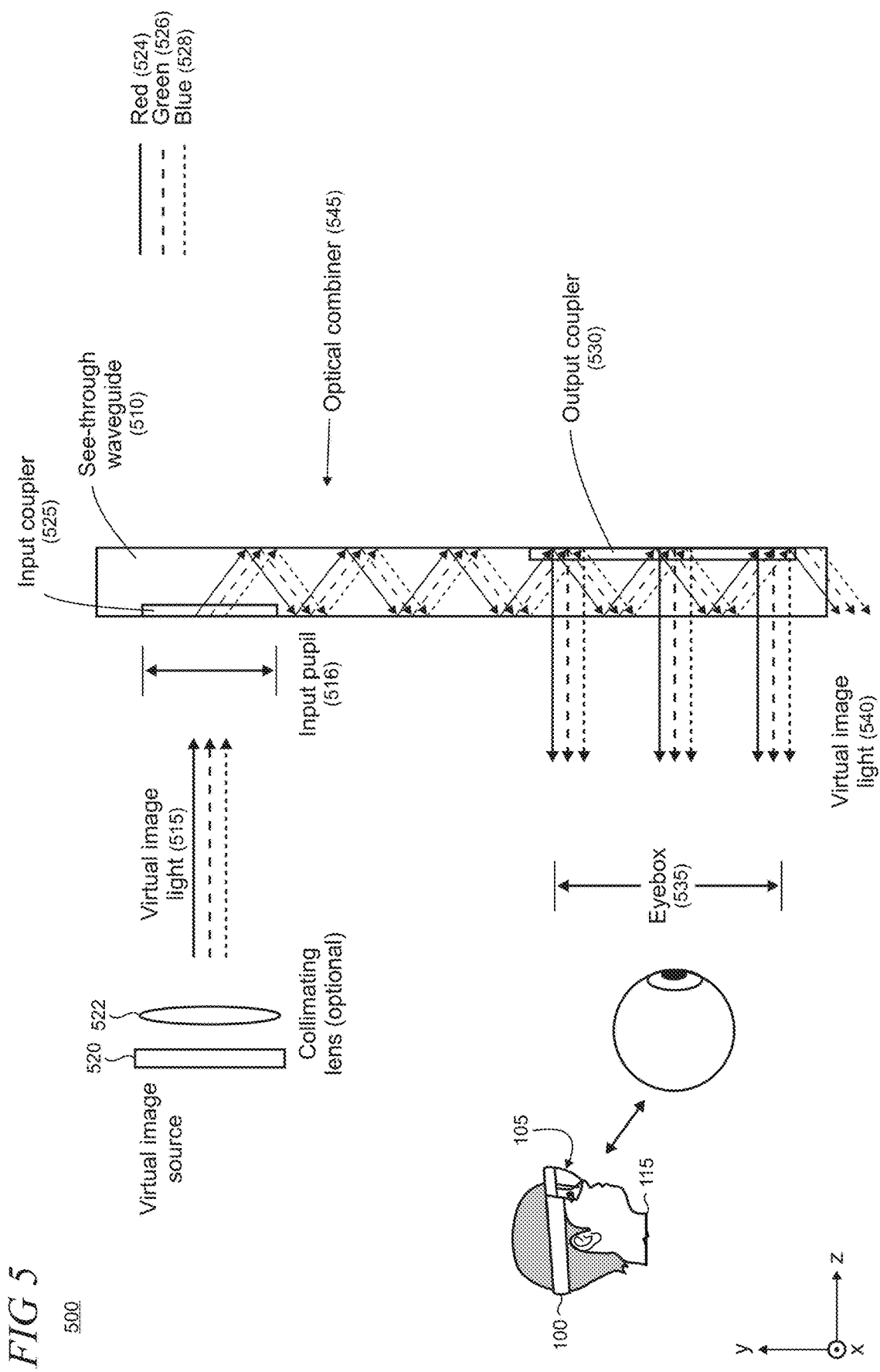

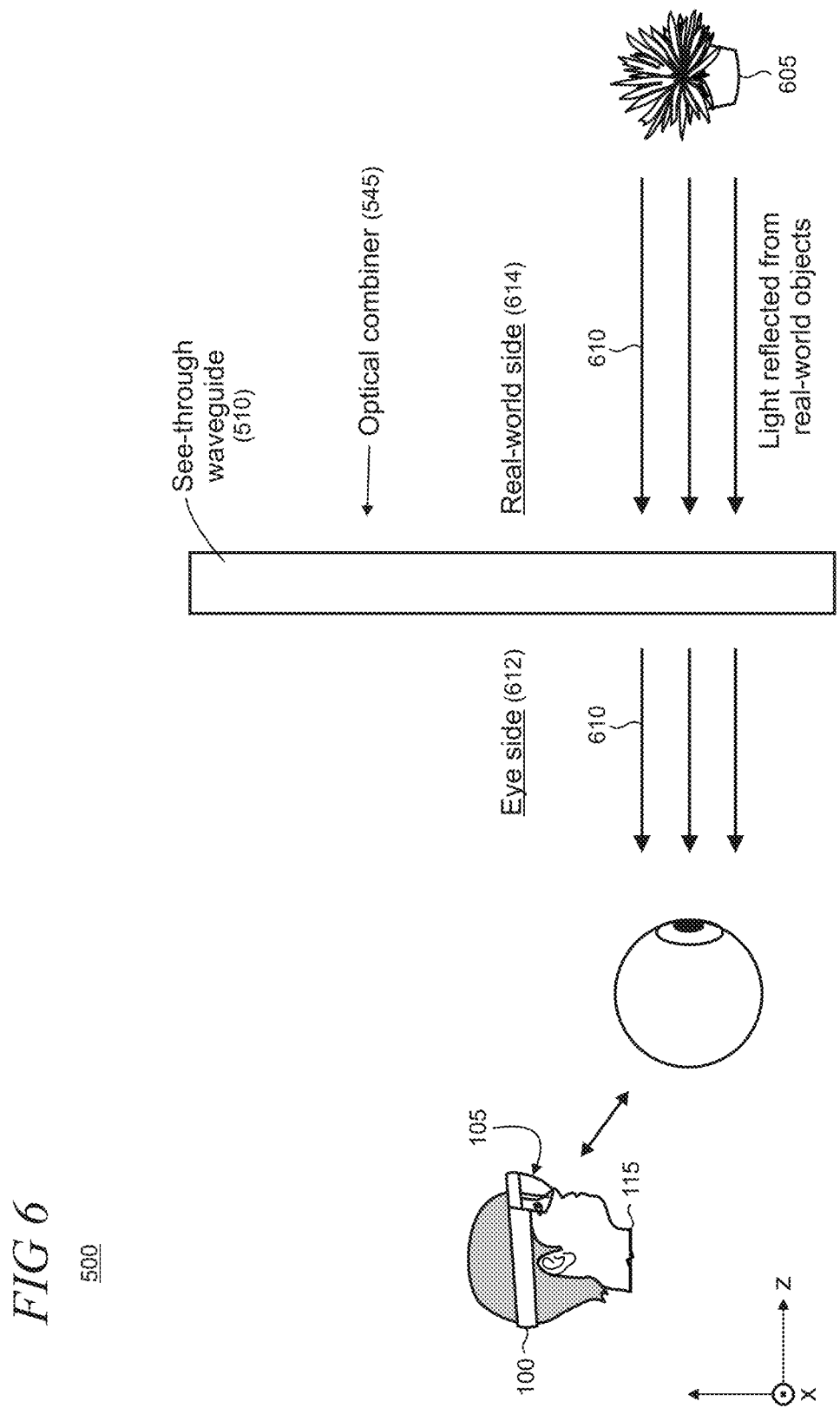

700

1200

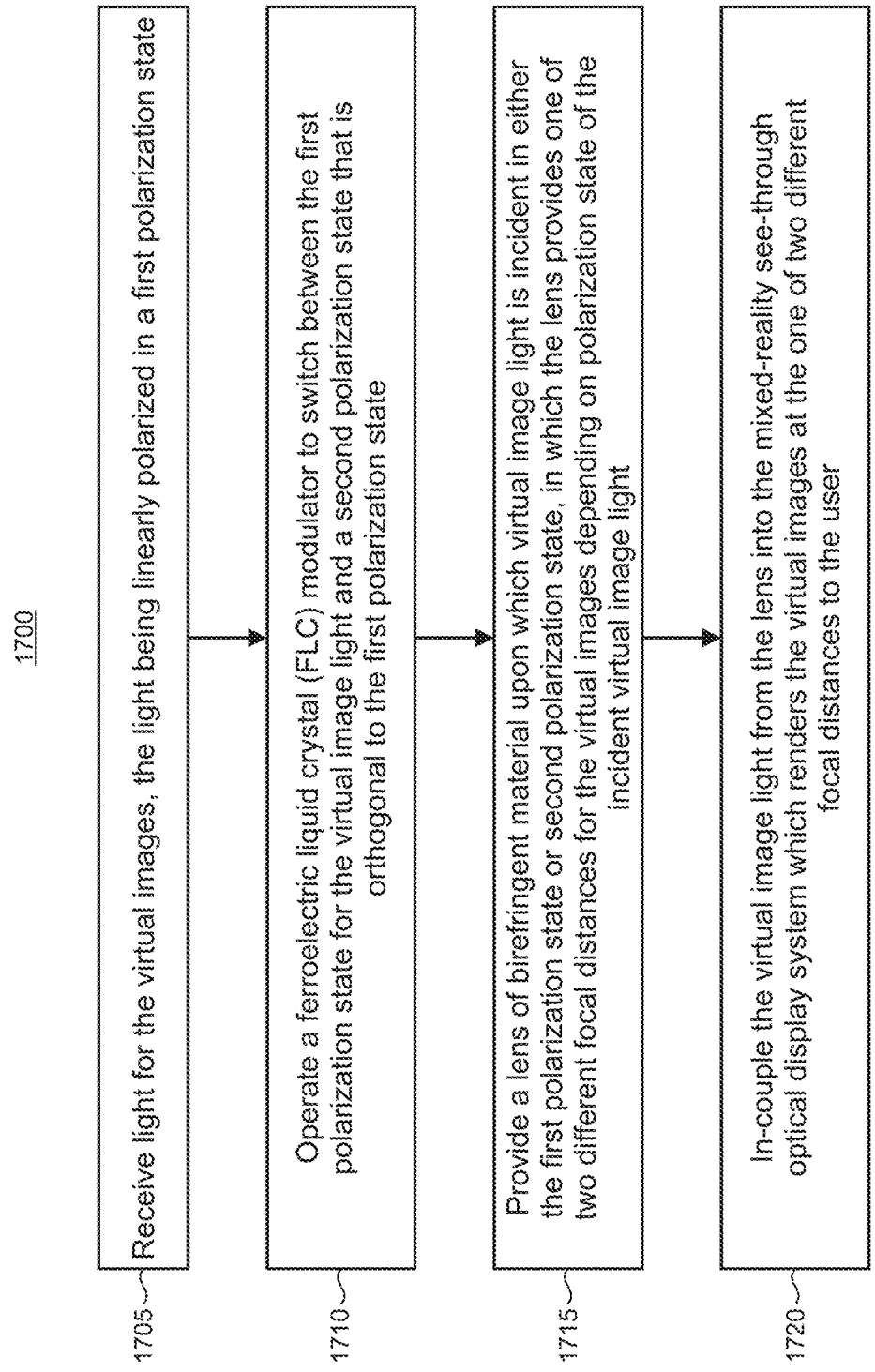

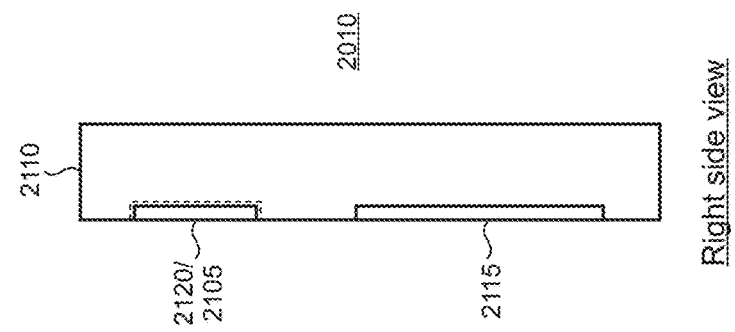
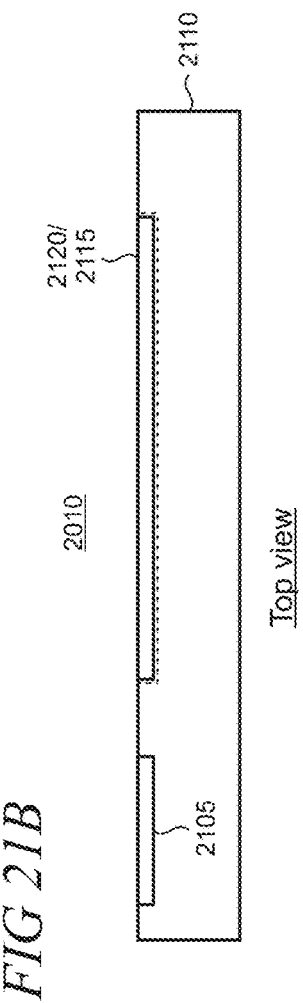
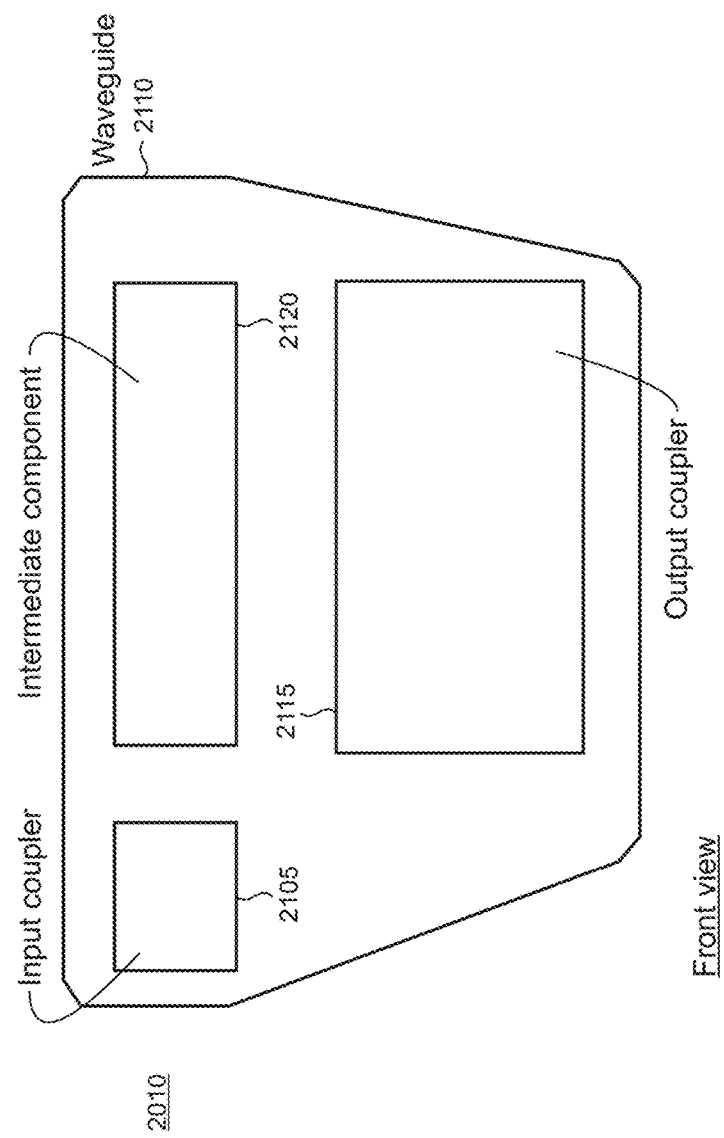

COMBINED BIREFRINGENT MATERIAL AND REFLECTIVE WAVEGUIDE FOR MULTIPLE FOCAL PLANES IN A MIXED-REALITY HEAD-MOUNTED DISPLAY DEVICE

BACKGROUND

Mixed-reality computing devices, such as head-mounted display (HMD) devices may be configured to display information to a user about virtual objects, such as holographic images, and/or real objects in a field of view of the user. For example, an HMD device may be configured to display, using a see-through display system, virtual environments with real-world objects mixed in, or real-world environments with virtual objects mixed in.

To view objects clearly, humans must accommodate, or adjust their eyes' focus, to the distance of the object. At the same time, the rotation of both eyes must converge to the object's distance to avoid seeing double images. In natural viewing, vergence and accommodation are linked. When something near is viewed, for example, a housefly close to the nose, the eyes cross and accommodate to a near point. Conversely, something viewed at optical infinity (roughly starting at 6 m or farther for normal vision), the eyes' lines of sight become parallel, and the eyes' lenses accommodate to infinity. In most HMD devices, users will always accommodate to the focal distance of the display to get a sharp image but converge to the distance of the object of interest to get a single image. When users accommodate and converge to different distances, the natural link between the two cues is broken, leading to visual discomfort or fatigue.

SUMMARY

An optical combiner in a display system of a mixed-reality HMD device comprises a lens of birefringent material and a ferroelectric liquid crystal (FLC) modulator that are adapted for use with a reflective waveguide to provide multiple different focal planes on which holograms of virtual-world objects (i.e., virtual images) are displayed. The FLC modulator controls the polarization state of light from a virtual image source that is incident on the birefringent lens. The FLC modulator is configured to function as a half-wave plate having an optical axis that can be rotated through approximately 45 degrees; therefore, the optical output from the modulator can be rotated by either zero degrees or ninety degrees.

The birefringent lens has two orthogonal refractive indices, ordinary and extraordinary, depending on the polarization state of the incident light. If the polarization axis is rotated by the FLC modulator to match the ordinary axis, then the incoming light to the birefringent lens is focused at a distance corresponding to the ordinary refractive index. If the axis is rotated to match the extraordinary axis, then the incoming light is focused at a different distance corresponding to the extraordinary refractive index.

Virtual image light leaving the birefringent lens is in-coupled to the reflective waveguide which is configured to form an exit pupil for the optical combiner to enable an HMD device user to view the virtual images from the source. The reflective waveguide is at least partially transparent so that the user can see through the waveguide to view physical real-world objects simultaneously with the virtual images in mixed-reality use scenarios.

The FLC modulator may be operatively synchronized to the virtual image source to dynamically switch polarization states, and the corresponding states of focus for virtual images, to support a given composition of a mixed-reality scene. In such compositions, images of virtual-world objects can appear to the user in focal planes at different distances along with real-world objects. The time response of the FLC modulator enables rapid state switching to construct a temporally multiplexed mixed-reality scene having appropriate focus cues to provide a comfortable visual experience no matter where in the scene the HMD user is accommodating.

When far virtual images in the mixed-reality scene are displayed, the FLC modulator is switched to cause the birefringent lens to focus the virtual images at the far focal plane so that the user's eyes accommodate far to view the virtual images in sharp focus. When near virtual images are displayed, the FLC modulator is switched to cause the birefringent lens to focus the virtual images at the near focal plane so that the user's eyes accommodate near to view the virtual images in sharp focus.

Advantageously, utilization of the FLC modulator, birefringent lens, and reflective waveguide enables the focal depth of the virtual images to be adjusted before entering the waveguide without perturbing the HMD device user's view of the real world through the waveguide. Such combination of elements in the optical combiner can eliminate the need to use a conventional conjugate lens pair in which a negative lens is disposed on an eye side of a waveguide to provide for virtual image focus at a non-infinite distance and a conjugate positive lens is disposed on the opposite real-world side to counteract the effect of the negative lens on incoming real-world light.

The FLC modulator and birefringent lens operate with faster switching compared to conventional variable-focus lenses to enable higher display refresh rates for a more immersive mixed-reality experience. In addition to providing fast-switching speeds, the FLC modulator and birefringent lens typically have solid state properties with no mechanical motion and associated noise or vibration. Utilization of the present principles enables the focus-adjusting components of the optical combiner to be moved away from the front of the HMD device user's eyes, which can provide flexibility in device packaging while reducing weight and mass moment of inertia which are typically important considerations for HMD device comfort.

In various illustrative embodiments, multiple sets of FLC modulators and birefringent lenses can be utilized. If N sets are utilized, then 2N different focal planes are provided. An eye tracker may also be implemented in the HMD device to enable the location of the user's eyes relative to the device to remain suitably calibrated in the event the device shifts on the head during use.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 4 shows an illustrative negative lens that provides for a virtual image that is located at a focal point of the lens;

FIG. 5 shows a side view of an illustrative virtual display system that includes a waveguide-based optical combiner providing for rendering of virtual images that may be used in an HMD device;

FIG. 6 shows a side view of an illustrative virtual display system in which light from real-world objects may be viewed through a see-through waveguide;

FIG. 17 is a flowchart of an illustrative method for operating an electronic device that includes a mixed-reality see-through optical display system for showing scenes comprising virtual images at multiple different focal planes that are superimposed over views of real-world objects;

FIGS. 21A, 21B and 21C are front, top, and side views, respectively, of an exemplary reflective waveguide that can be used to replicate a virtual image associated with an input pupil to an expanded exit pupil;

Like reference numerals indicate like elements in the drawings. Elements are not drawn to scale unless otherwise indicated.

DETAILED DESCRIPTION

Figure 1:
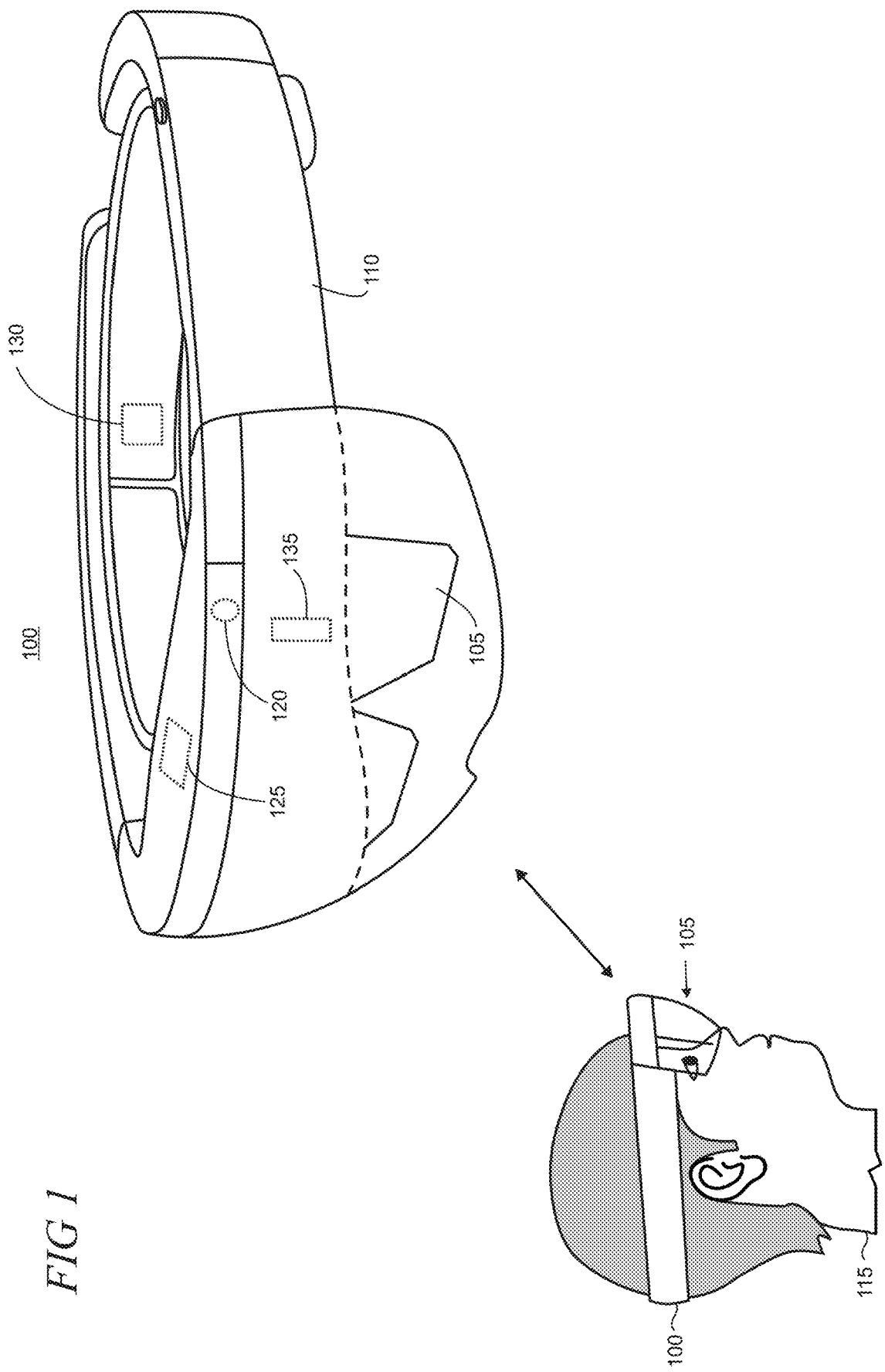
FIG. 1 shows a pictorial partially cutaway view of an illustrative HMD device that is configured to implement multiple virtual image focal planes using the present combined birefringent material and reflective waveguide.

FIG. 1 shows a pictorial partially cutaway view of an illustrative mixed-reality HMD device 100 that is configured to implement multiple virtual image focal planes using the present combined birefringent material and reflective waveguide. In this example, the HMD device includes a display device 105 and a frame 110 that wraps around the head of a user 115 to position the display device near the user's eyes to provide a mixed-reality experience to the user.

Any suitable technology and configuration may be used to display virtual images, which may also be referred to as holograms or holographic images, using the display device 105. For a mixed-reality experience, the display device may be see-through so that the user of the HMD device 100 can view physical, real-world objects in the physical environment over which pixels for virtual objects are overlayed. For example, the display device may include one or more partially transparent waveguides used in conjunction with a virtual image source such as, for example, a microdisplay comprising RGB (red, green, blue) LEDs (light emitting diodes), an organic LED (OLED) array, liquid crystal on silicon (LCoS) device, and/or MEMS device, or any other suitable displays or microdisplays operating in transmission, reflection, or emission. The virtual image source may also include electronics such as processors, optical components such as mirrors and/or lenses, and/or mechanical and other components that enable a virtual display to be composed and provide one or more input optical beams to the display system. Virtual image sources may be referred to as light or display engines in some contexts.

In some implementations, outward facing cameras 120 that capture images of the surrounding physical environment may be provided, and these captured images may be rendered on the display device 105 along with computer-generated virtual images that augment the captured images of the physical environment.

The frame 110 may further support additional components of the HMD device 100, including a processor 125, an inertial measurement unit (IMU) 130, and an eye tracker 135. In some implementations the eye tracker can be configured to support one or more of vergence tracking and/or gaze tracking functions. The processor may include logic and associated computer memory configured to receive sensory signals from the IMU and other sensors, to provide display signals to the display device 105, to derive information from collected data, and to enact various control processes described herein.

The display device 105 may be arranged in some implementations as a near-eye display. In a near-eye display, the virtual image source does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the holographic virtual image light after leaving the display system. The exit pupil defines the eyebox which comprises a spatial range of eye positions of the user in which the holographic virtual images projected by the display device are visible.

Figure 2:
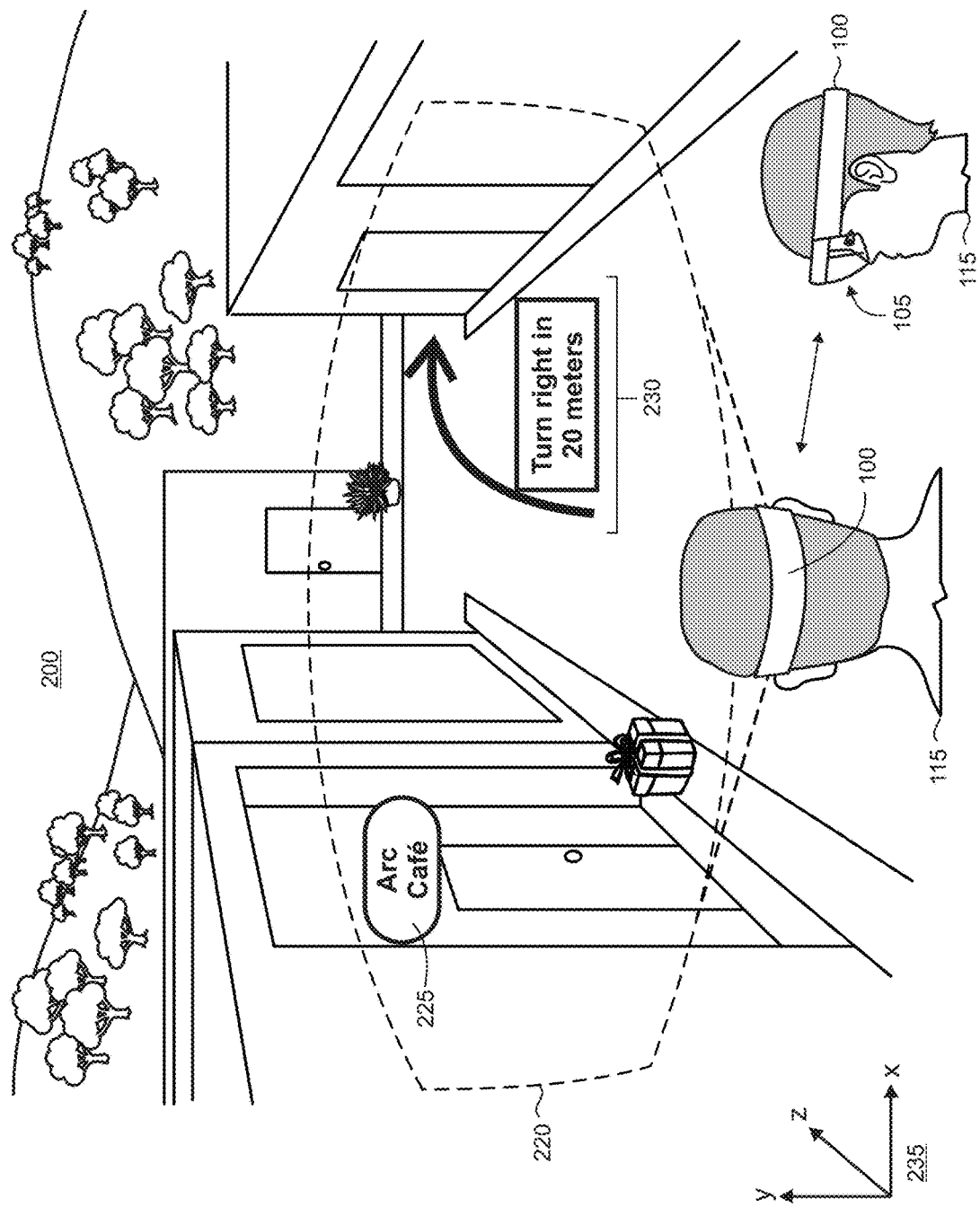
FIG. 2 illustratively shows virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display device 105 is configured as a near-eye display system having at least a partially transparent, see-through waveguide, among various other components, and may be further adapted to utilize variable-focus lenses in accordance with the principles discussed herein. As noted above, a virtual image source (not shown) generates holographic virtual images that are guided by the waveguide in the display device to the user. Being see-through, the waveguide in the display device enables the user to perceive light from the real world to thereby have an unaltered view of real-world objects.

The see-through waveguide-based display device 105 can render holographic images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the holographic images in the virtual world are not necessarily identical, as the virtual FOV provided by the display device is typically a subset of the real FOV. FOV is typically described as an angular parameter in horizontal, vertical, or diagonal dimensions. It may be understood that the terms such as "left," "right," "up," "down," "direction," "horizontal," and "vertical" are used primarily to establish relative orientations in the illustrative examples shown and described herein for ease of description. These terms may be intuitive for a usage scenario in which the user of the HMD device is upright and forward facing, but less intuitive for other usage scenarios. The listed terms are not to be construed to limit the scope of the configurations (and usage scenarios therein) of features utilized in the present arrangement.

It is noted that FOV is just one of many parameters that are typically considered and balanced by HMD device designers to meet the requirements of a particular implementation. For example, such parameters may include eyebox size, brightness, transparency and duty time, contrast, resolution, color fidelity, depth perception, size, weight, form factor, and user comfort (i.e., wearable, visual, and social), among others.

In the illustrative example shown in FIG. 2, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the holographic virtual images include a tag 225 that identifies a restaurant business and directions 230 to a place of interest in the city. The mixed-reality environment 200 seen visually on the waveguide-based display device may also be supplemented by audio and/or tactile/haptic sensations produced by the HMD device in some implementations.

Virtual images and digital content can be located in various positions within the FOV along all three axes of the coordinate system 235. The immersiveness of the content in three dimensions may be enhanced as the reach of the display along the "z" axis extends from the near-field focus plane (i.e., generally within arm's length of the HMD device user) to the far field focus plane (i.e., generally beyond arm's reach) to facilitate arm's length virtual display interactions. Many mixed-reality HMD device experiences will employ a mix of near-field and far-field visual components. The boundary between near and far fields is not necessarily strictly defined and can vary by implementation. For example, distances beyond 2 m may be considered as the part of the far field in some mixed-reality HMD device scenarios.

During natural viewing, the human visual system relies on multiple sources of information, or "cues," to interpret three-dimensional shapes and the relative positions of objects. Some cues rely only on a single eye (monocular cues), including linear perspective, familiar size, occlusion, depth-of-field blur, and accommodation. Other cues rely on both eyes (binocular cues), and include vergence (essentially the relative rotations of the eyes required to look at an object) and binocular disparity (the pattern of differences between the projections of the scene on the backs of the two eyes).

To view objects clearly, humans must accommodate, or adjust their eyes' focus, to the distance of the object. At the same time, the rotation of both eyes must converge to the object's distance to avoid seeing double images. The distance at which the lines of sight intersect is the vergence distance. The viewer also adjusts the focal power of the lens in each eye (i.e., accommodates) appropriately for the fixated part of the scene (i.e., where the eyes are looking). The distance to which the eye must be focused to create a sharp retinal image is the focal distance. In natural viewing, vergence and accommodation are linked. When viewing something near (e.g., a housefly close to the nose) the eyes cross and accommodate to a near point. Conversely, when viewing something at optical infinity, the eyes' lines of sight become parallel, and the eyes' lenses accommodate to infinity.

In typical HMD devices, users will always accommodate to the focal distance of the display (to get a sharp image) but converge to the distance of the object of interest (to get a single image). When users accommodate and converge to different distances, the natural link between the two cues must be broken and this can lead to visual discomfort or fatigue due to such vergence-accommodation conflict (VAC). Accordingly, to maximize the quality of the user experience and comfort with the HMD device 100, virtual images may be rendered in a plane to appear at a constant distance from the user's eyes. For example, virtual images, including the images 225 and 230, can be set at a fixed depth (e.g., 2 m) from the user 115. Thus, the user will always accommodate near 2 m to maintain a clear image in the HMD device. It may be appreciated that 2 m is an illustrative distance and is intended to be non-limiting. Other distances may be utilized, and virtual images may typically be optimally placed at distances between 1.5 and 5 m from the HMD device user for many applications of a mixed-reality HMD device while ensuring user comfort, however in some applications and use cases, virtual images can be rendered more closely to the user.

Figure 3A:
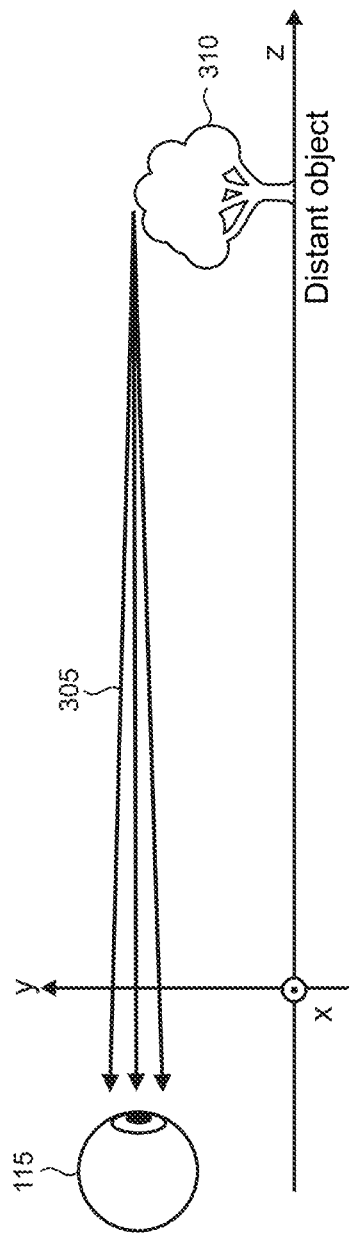
FIGS. 3A, 3B, and 3C show illustrative partially spherical wavefronts that are respectively associated with a distant object, an object at infinity, and a nearby object.
Figure 3B:
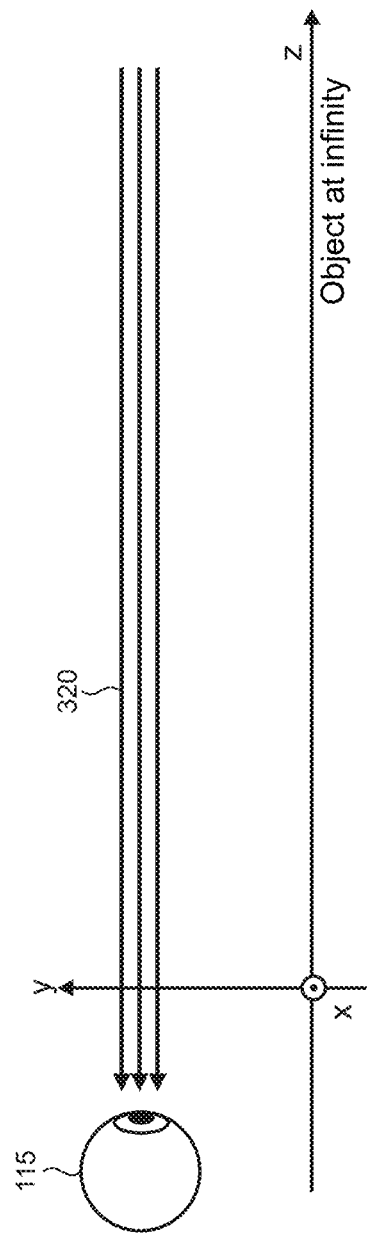
Figure 3C:
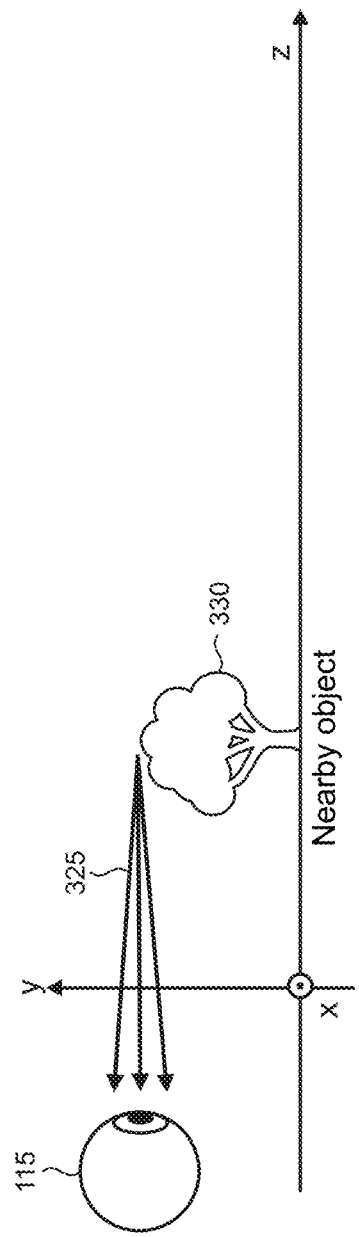

In the real world as shown in FIG. 3A, light rays 305 from distant objects 310 reaching an eye of a user 115 are almost parallel. Real-world objects at optical infinity (roughly around 6 m and farther for normal vision) have light rays 320 that are exactly parallel when reaching the eye, as shown in FIG. 3B. Light rays 325 from a nearby real-world object 330 reach the eye with different, more divergent angles, as shown in FIG. 3C, compared to those for more distant objects.

Various approaches may be utilized to render virtual images with the suitable divergent angles to thereby appear at the targeted depth of focus. For example, FIG. 4 shows that a negative (i.e., concave) lens 405 can diverge the collimated/parallel rays 450 that are received from a conventional output coupler element (not shown) in an HMD device to produce a holographic virtual image having a location that is apparent to the user at a focal point, F (as indicated by reference numeral 415), that is determined by the focal length of the lens. For example, in various mixed-reality HMD device scenarios, focal lengths can range between −0.2 to −3.0 diopters (i.e., 33 cm to 5 m) to position virtual objects from the boundary of the far field (near infinity) to slightly more than one foot away. As shown, the rays from the negative lens arriving at the user's eye 115 are non-parallel and divergent and converge using the eye's internal lens to form the image on the retina, as indicated by reference numeral 420.

FIG. 5 shows a simplified side view of an illustrative mixed-reality display system 500 that is incorporated into the display device 105 (FIG. 1) and which may be used in the HMD device 100 to render virtual images. It is noted that the side view of FIG. 5 shows display components for a single eye of the user 115. However, it may be appreciated that the components can be extended such that separate displays are provided for each eye of the user in binocular implementations. Such arrangement may facilitate, for example, stereoscopic rendering of virtual images in the FOV of the HMD device 100 and enable other features to be realized on a per-eye basis.

The mixed-reality display system 500 includes at least one partially transparent (i.e., see-through) waveguide 510 that is configured to propagate visible light. The waveguide 510 facilitates light transmission between a virtual image source 520 and the eye of the user 115. One or more waveguides can be utilized in the near-eye display system because they are transparent and because they are generally small and lightweight. This is desirable in applications such as HMD devices where size and weight are generally sought to be minimized for reasons of performance and user comfort. Use of the waveguide can enable the virtual image source to be located out of the way, for example on the side of the user's head or near the forehead, leaving only a relatively small, light, and transparent waveguide optical element in front of the eyes.

In an illustrative implementation, the waveguide 510 operates using a principle of total internal reflection (TIR) so that light can be coupled among the various optical elements in the HMD device 100. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law states that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Virtual image light 515 may be provided by a virtual image source 520 (e.g., a microdisplay or light engine, etc.). A collimating lens 522 may be optionally utilized depending on a particular type and configuration of the virtual image source so that the inputs to the waveguide comprise collimated light rays. The virtual image light is in-coupled to the waveguide by an input coupler 525 over an input pupil 516 and propagated through the waveguide in TIR. The virtual image light is out-coupled from the waveguide by an output coupler 530 over the eyebox 535 of the display system.

The exit pupil for the out-coupled image light 540 provided by the eyebox is typically expanded in size relative to the input pupil, in both vertical and horizontal directions. Typically, in waveguide-based optical combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. The collimated inputs and outputs in conventional waveguide-based display systems provide holographic virtual images displayed by the display device that are focused at infinity.

The combination of see-through waveguide and coupling elements may be referred to as a mixed-reality optical combiner 545 which functions to combine real-world and virtual-world images into a single display. While the input coupler and output coupler are shown in FIG. 5 as being embodied as discrete elements, it may be possible in some applications to directly incorporate the in-coupling and out-coupling functions either partially or fully into the waveguide and/or components thereof.

The optical combiner functionality provided by the waveguide and couplers may be implemented using a reflective waveguide combiner. For example, partially reflective surfaces may be embedded in a waveguide and/or stacked in a geometric array to implement an optical combiner that uses partial field propagation. The reflectors can be half-tone, dielectric, holographic, polarized thin layer, or be fractured into a Fresnel element. In other embodiments, the principles of the present combined birefringent material and reflective waveguide may be implemented using a reflective waveguide combiner with any suitable in-coupling and/or out-coupling methods.

A plurality of waveguides may be utilized in some applications. As shown in FIG. 5, the combiner 545 includes a single waveguide that is utilized for all colors in the virtual images, which may be desirable in some applications. For example, if the virtual image source 520 is configured using an RGB (red, green, blue) color model, then the waveguide 510 can be adapted to propagate light in each color component, as respectively indicated by reference numerals 524, 526, and 528. By comparison, diffractive combiners typically require multiple waveguides to meet a target FOV in polychromatic applications due to limitations on angular range that are dictated by the waveguide TIR condition.

The present combined birefringent material and reflective waveguide may also be utilized with various other waveguide/coupling configurations beyond reflective. For example, it may be appreciated that the principles of the present invention may be alternatively applied to waveguides that include one or more elements that are refractive, diffractive, polarized, hybrid diffractive/refractive, phase multiplexed holographic, and/or achromatic metasurfaces.

As shown in FIG. 6, the user 115 can look through the waveguide 510 of the mixed-reality display system 500 to see unaltered views of real-world objects 605 on the real-world side of the waveguide that is opposite from the eye side (the eye side is indicated by reference numeral 612 and the real-world side is indicated by reference numeral 614). The optical combiner 545 may superimpose virtual images (not shown for the sake of clarity in exposition) over the user's view of light 610 reflected from real-world objects to thus form a mixed-reality display. In this particular example, the real-world object is in the distance so the parallel rays of real-world light incident on the display system remain parallel when viewed by the user 115.

Figure 7:
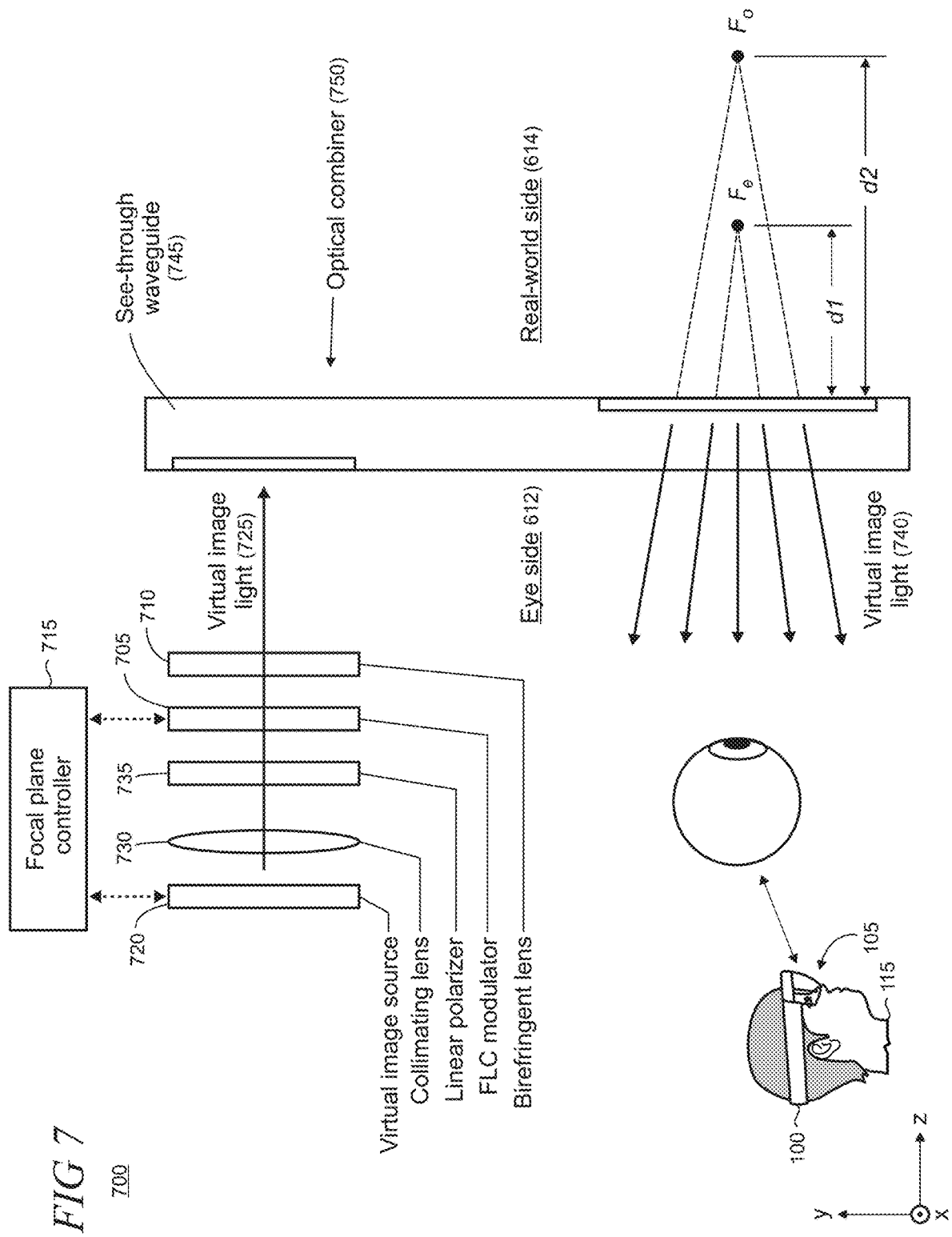
FIG. 7 shows a side view of an illustrative virtual display system in which a ferroelectric liquid crystal (FLC) modulator and a lens comprising birefringent material are selectively controlled to enable rendering of virtual images at two different focal planes.

FIG. 7 shows a side view of an illustrative mixed-reality display system 700 in which a ferroelectric liquid crystal (FLC) modulator 705 and a lens 710 comprising birefringent material are selectively controlled using a focal plane controller 715 to enable rendering of virtual images using diverging rays 740. The virtual images can appear to the user 115 at focal distances $F_e$ and $F_o$ that respectively define two different focal planes at distances d1 and d2 from the see-through waveguide 745 in an optical combiner 750. The waveguide and/or optical combiner may comprise reflective elements in a similar manner as discussed above in the text accompanying FIG. 5. It is noted that the propagation of light through the see-through waveguide is not shown for sake of clarity. It may also be appreciated that the user 115 can look through the see-through waveguide to observe real-world objects which are also not shown in the drawing.

A virtual image source 720 provides virtual image light 725 which may comprise multiple components (not shown) of a color model such as an RGB color model. As with the mixed-reality display system 500 shown in FIG. 5, a collimating lens 730 may be optionally utilized depending on characteristics of the source. A linearly polarizing filter 735 is disposed on the propagation path of the virtual image light between the collimating lens and FLC modulator, as shown. The focal plane controller 715 is operatively coupled to the virtual image source 720 and FLC modulator 705.

Figure 8:
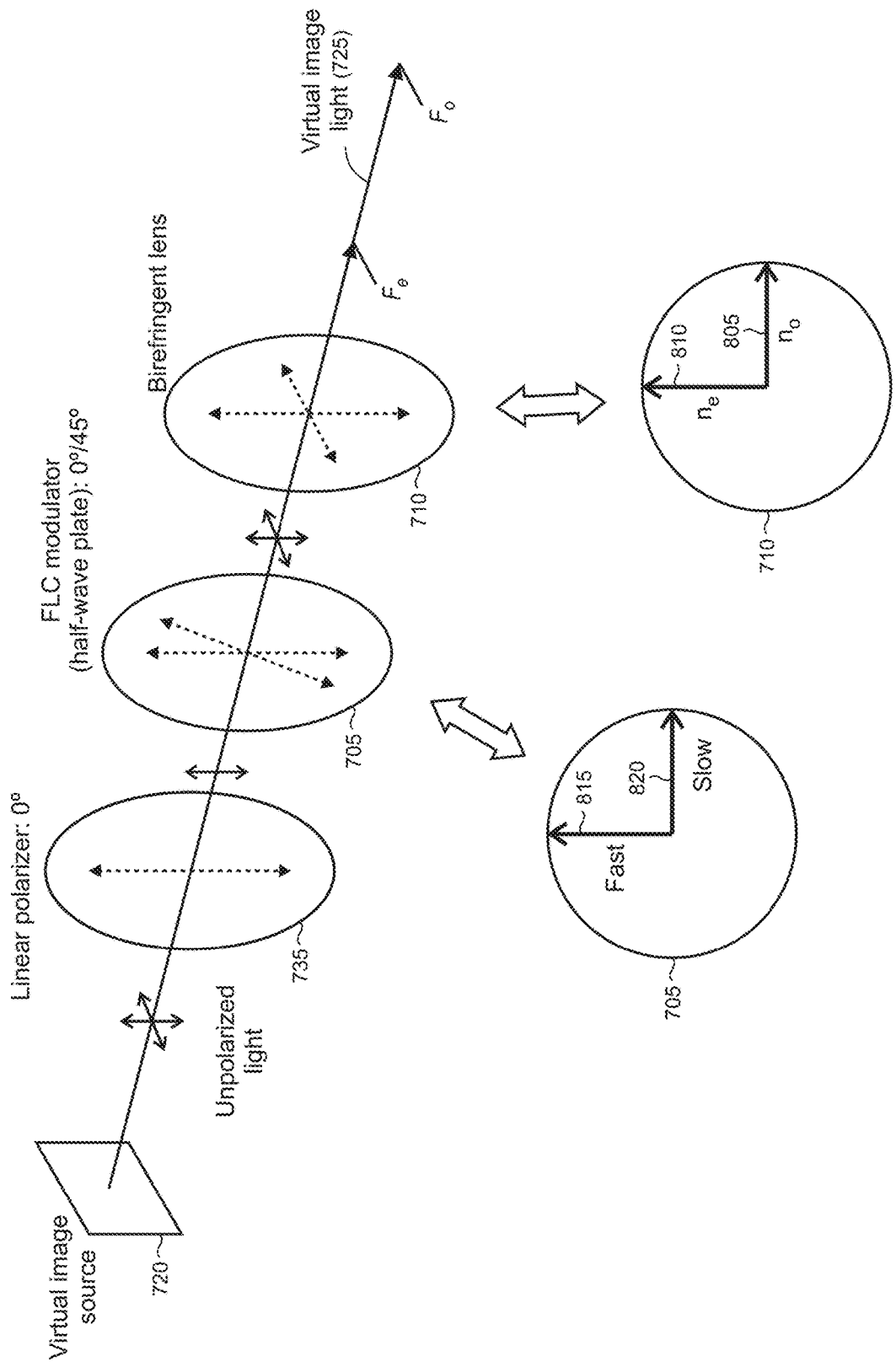
FIG. 8 shows propagation of linearly polarized light through the FLC modulator and birefringent lens to focus light at different focal planes.

FIG. 8 shows propagation of linearly polarized light through the FLC modulator 705 and birefringent lens 710 to focus light at different focal planes. A property of the lens is that it has two focal lengths, $F_o$ and $F_e$, that correspond to ordinary and extraordinary refractive indices, $n_o$ and $n_e$, of the birefringent material, as indicated by reference numerals 805 and 810. The birefringent lens may comprise any suitable birefringent material that is transparent and formable. The birefringent lens is not shown with any particular shape in FIG. 8, but it may be appreciated that one or more of its major surfaces can be shaped to provide additional control over the focal lengths to meet particular requirements.

The unpolarized light from the virtual image source 720 passes through the linearly polarizing filter 735 and is incident on the FLC modulator 705. The linearly polarizing filter is aligned with either the ordinary or extraordinary axis of the birefringent lens. The FLC modulator is configured to function as a switchable half-wave plate having a binary state. The FLC modulator has a fast axis 815 and slow axis 820. The fast axis provides a minimum index of refraction for one state of polarization of a linearly polarized wave with a maximum phase velocity. When the wave is rotated by 90° and polarized along the slow axis it will propagate with a maximum index of refraction and minimum phase velocity. The FLC modulator is oriented at either zero or 45° to the axis of the linearly polarizing filter depending on its switched state. In alternative implementations, rather than using an FLC modulator, polarization modulation may be performed by an appropriately configured photo-elastic modulator (PEM), linear electro-optic modulator employing, for example, the Pockels effect, quadratic electro-optic modulator employing, for example, the Kerr effect, magneto-optical modulator employing, for example, the Faraday effect, piezoelectric material, or other suitable device or technology.

If the FLC modulator 705 is in a first state, then virtual image light remains polarized at 0° when it propagates to the birefringent lens 710 and is thus aligned with the ordinary axis and is focused at focal length $F_o$. If the FLC modulator is in a second state, then the plane of polarization of emergent light is rotated by 90° and is aligned with the extraordinary axis of the birefringent lens and thus focused at focal length $F_e$. Accordingly, by switching between FLC modulator states, one of two different refractive indices of the birefringent lens may be selected which thereby selects one of two different focal powers for the lens.

Referring again to FIG. 7, the presentation of virtual images in a mixed-reality scene by the virtual image sources 720 may be synchronized to operations of the FLC modulator 705 using the focal plane controller 715. The synchronization enables construction of temporally multiplexed scenes with correct focus cues so that focal distances in the scene are presented with the birefringent lens 710 in the correct state. Accordingly, when more distant parts of the mixed-reality scene are composed at the virtual image source 720, the focal plane controller signals the FLC modulator to switch the birefringent lens to its longer focal length so that the user's eyes have to accommodate far to create sharp retinal images. When nearer parts of the mixed-reality scene are composed, the focal plane controller signals the FLC modulator to switch the birefringent lens to its shorter local length so that the user's eyes must accommodate to closer distances to create sharp images. It may be appreciated that each focal state in a given composition of a mixed-reality scene will be displayed in every other frame of the virtual image source.

Figure 9:
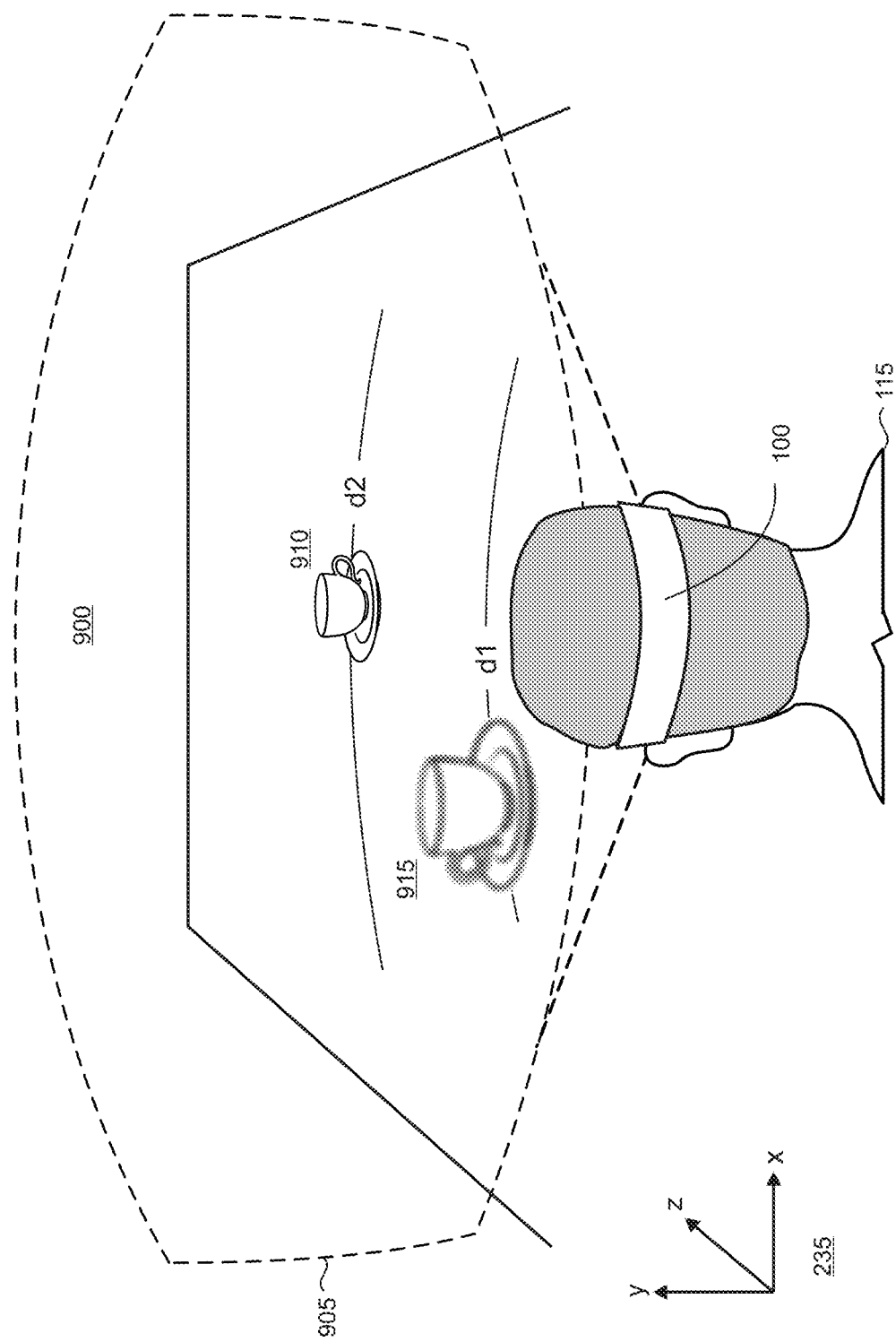
FIG. 9 shows an illustrative mixed-reality scene in which the user's eyes accommodate to a far distance to view a virtual-world object in sharp focus.

FIG. 9 shows an FOV 905 of an illustrative mixed-reality scene 900 in which the virtual image source displays more distant parts of the scene. In response, the FLC modulator switches the birefringent lens to the $F_e$ focal length. Thus, the mixed-reality display system creates a digital approximation to the light field that the user's eyes normally encounter when naturally viewing a three-dimensional scene. It is not necessary to know where the eyes of the user 115 are focused to create appropriate focus cues.

Figure 10:
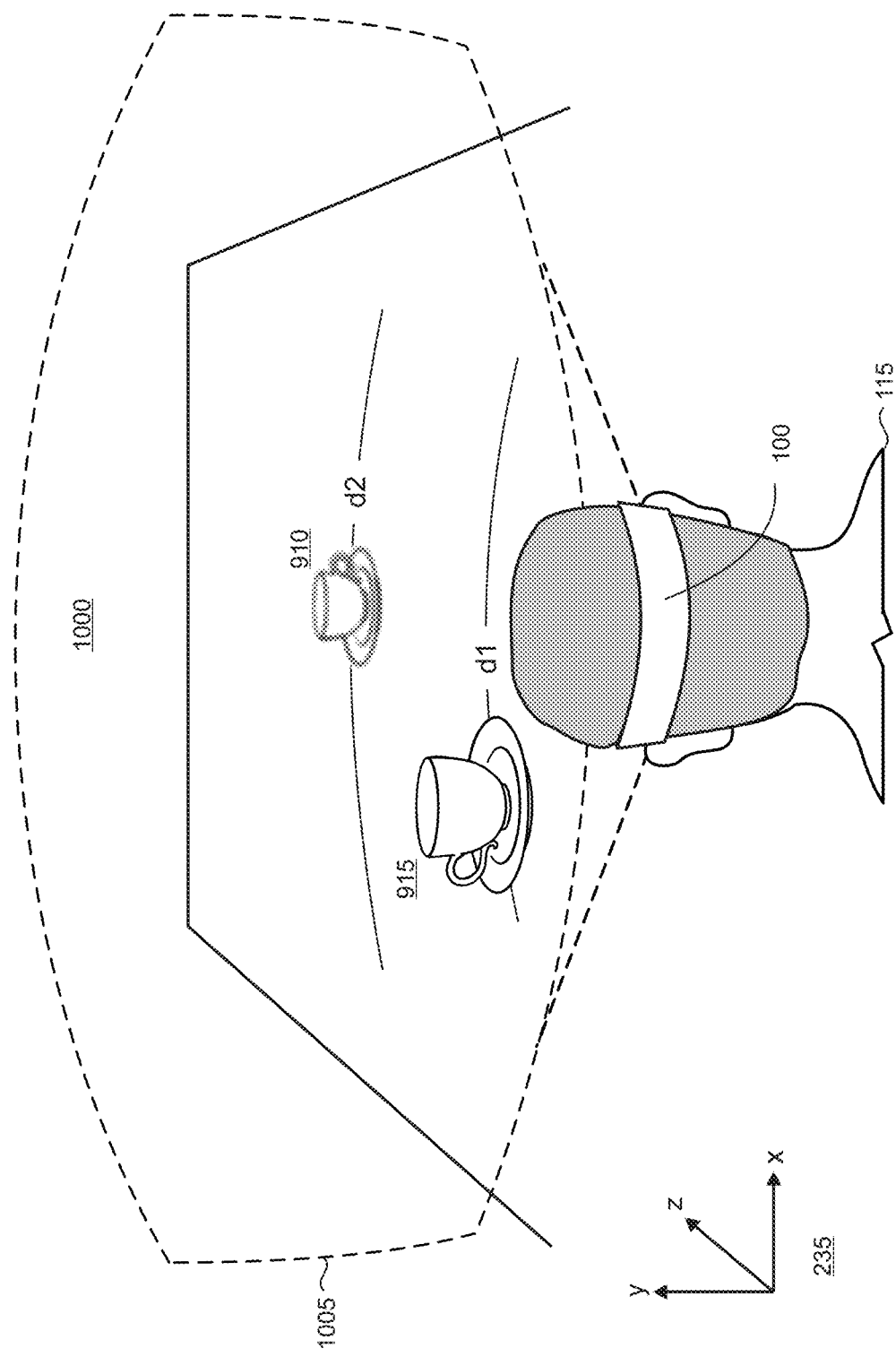
FIG. 10 shows an illustrative mixed-reality scene in which the user's eyes accommodate to a near distance to view a virtual-world object in sharp focus.

If the user accommodates to a far distance at d2 to view a virtual-world object 910, then the far parts of the displayed scene are in sharp focus while the near parts, including virtual-world object 915, are blurred. FIG. 10 shows an FOV 1005 of illustrative mixed-reality scene 1000 in which the user accommodates to a near distance at d1 to view the virtual-world object 915 in sharp focus while the far parts, including virtual-world object 910, are blurred. The mixed-reality display system thus reproduces correct focus cues, including blur and binocular disparity, to thereby stimulate natural accommodation to converge to an appropriate focal distance to create sharp retinal images.

The values for the distances d1 and d2 may be selected based on application. In typical HMD device applications, virtual images may be sought to be displayed within 2 m (−0.5 diopters) to minimize VAC. As the depth of field for human vision is approximately +/−0.3 diopters, a halfdiopter distance between focal planes may be utilized with sufficient focus cues to enable the user to smoothly shift focus between the focal planes. Thus, for example, the near distance may be around 1 m, and the far distance around 2 m. These values are illustrative and are not intended to be limiting.

Figure 11:
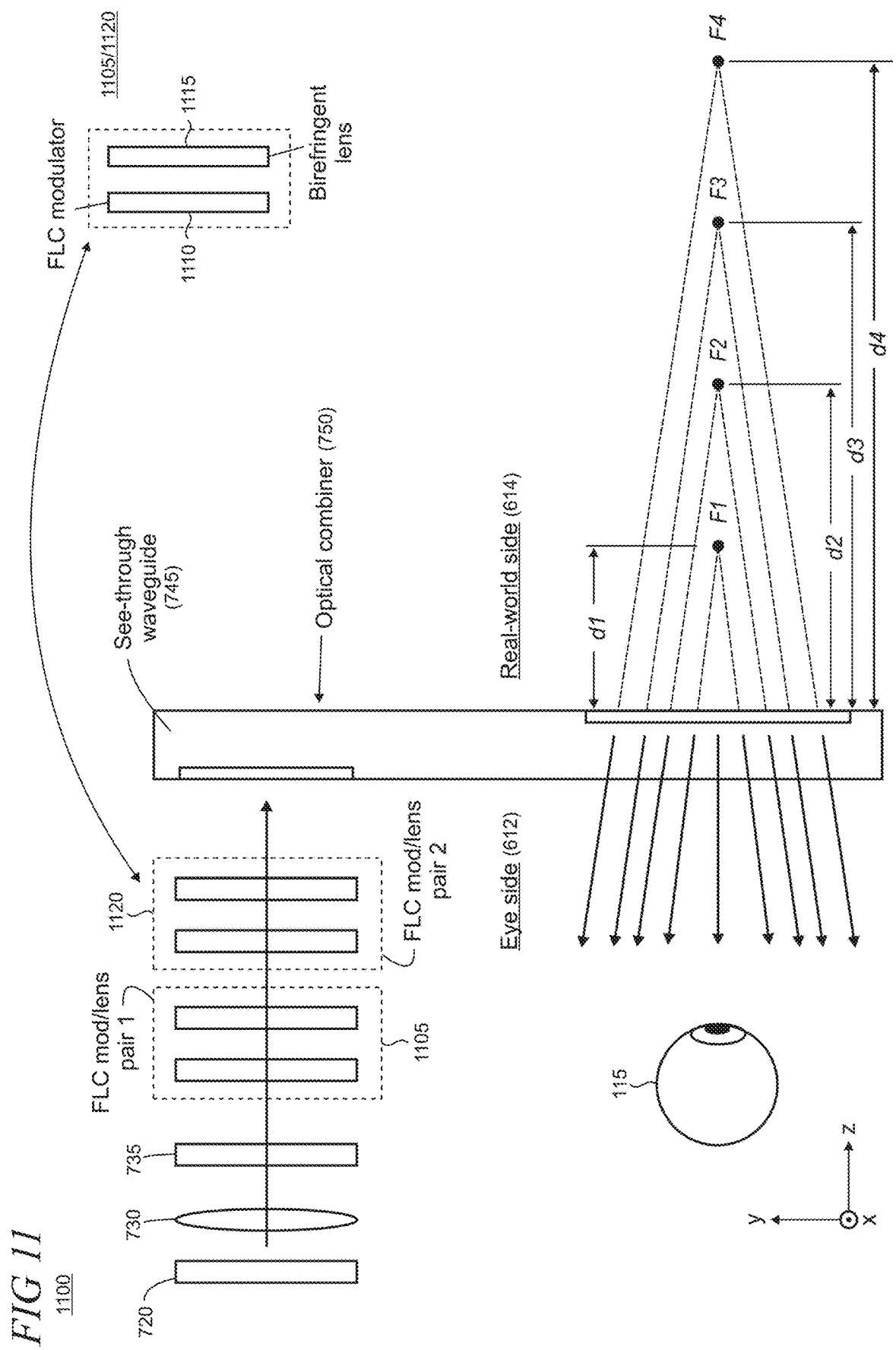
FIG. 11 shows an arrangement in which N sets of an FLC modulator and a birefringent lens are utilized to provide 2N different virtual image focal planes.

FIG. 11 shows an illustrative mixed-reality display system 1100 in which N sets of an FLC modulator and a birefringent lens are utilized to provide $2^N$ different virtual image focal planes. In this example N=2 so a first set 1105 comprising an FLC modulator 1110 and birefringent lens 1115 is placed in series with a second set 1120. As shown, the serial arrangement of modulator and lens sets are disposed along the virtual image light path that extends from the virtual image source 720 through the collimating lens 730 and linearly polarizing filter 735 to the see-through waveguide 745 in the optical combiner 750.

The two sets 1105 and 1120 of FLC modulators and birefringent lenses work in combination to provide four different focal lengths F1, F2, F3, and F4 at respective distances d1, d2, d3, and d4 from the waveguide 745. The spatial separation between the focal planes defined by the focal lengths can vary by application. For example, F1 and F4 could be separated by 1.5 diopters in which d1, d2, d3, and d4 are 50 cm, 1 m, 1.5 m, and 2 m, respectively.

Figure 12:
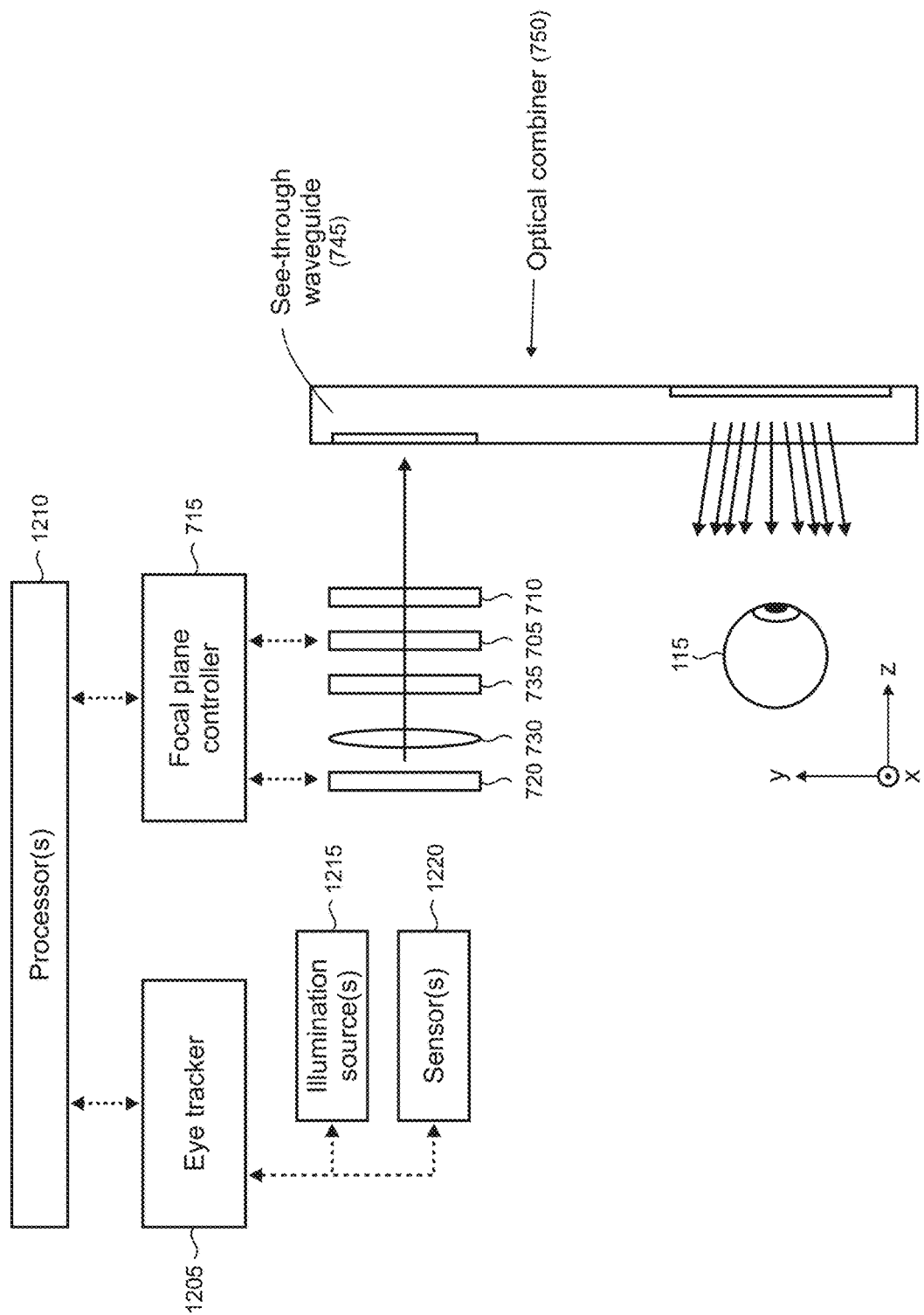
FIG. 12 shows a side view of an illustrative virtual display system in operative relationship with HMD device components including an eye tracker system, focal plane controller, and processors.

FIG. 12 shows a side view of an illustrative virtual display system 1200 in operative relationship with HMD device components including an eye tracker 1205, focal plane controller 715, and processors 1210. The focal plane controller is operatively coupled to a virtual image source 720 and FLC modulator 705, as discussed above, to provide multiple different focal lengths using the birefringent lens 710 to render virtual images at different distances on the optical combiner 750 in mixed-reality scenarios. The components may be disposed in a frame (not shown) or other suitable structure of the HMD device 100 or the exemplary HMD device 2200 shown in FIGS. 22 and 23 and described in the accompanying text.

The eye tracker 1205 is operatively coupled to one or more illumination sources 1215 and one or more sensors 1220. For example, the illumination sources may comprise IR (infrared) LEDs that are located around the periphery of the virtual display system and/or optical combiner and/or may be disposed in some other suitable HMD device component such as a frame. The eye tracker illumination sources can function as glint sources and/or provide general or structured illumination of the user's eye features. The eye tracker sensors may comprise inward-facing cameras that have sensitivity, for example, to IR light. Image-based and/or feature-based eye tracking, or other suitable eye-tracking techniques may be utilized to meet requirements of an implementation of the present principles.

In an illustrative example, the IR light from the illumination sources 1215 cause highly visible reflections, and the eye tracker sensors 1220 capture an image of the eye showing these reflections. The images captured by the sensors are used to identify the reflection of the light source on the cornea (i.e., "glints") and in the pupil. Typically, a vector formed by the angle between the cornea and pupil reflections may be calculated using real-time image analysis, and the vector direction combined with other geometrical features of the reflections is then used to determine where the user is looking—the gaze point—and calculate eye movement, location, and orientation.

Eye tracking may be utilized to initially calibrate a location of the user's eyes with respect to the HMD device 100 and assist in maintaining the calibration state during device use. The eye tracker 1205 can dynamically track eye location relative to the HMD device which may change if, for example, the device shifts on the user's head. Proper continuous alignment of the user's eye with the display system can ensure that a display of virtual images in the different focal planes is correctly rendered with the appropriate focus cues including accurate binocular disparity and occlusion of real and virtual objects.

Figure 13:
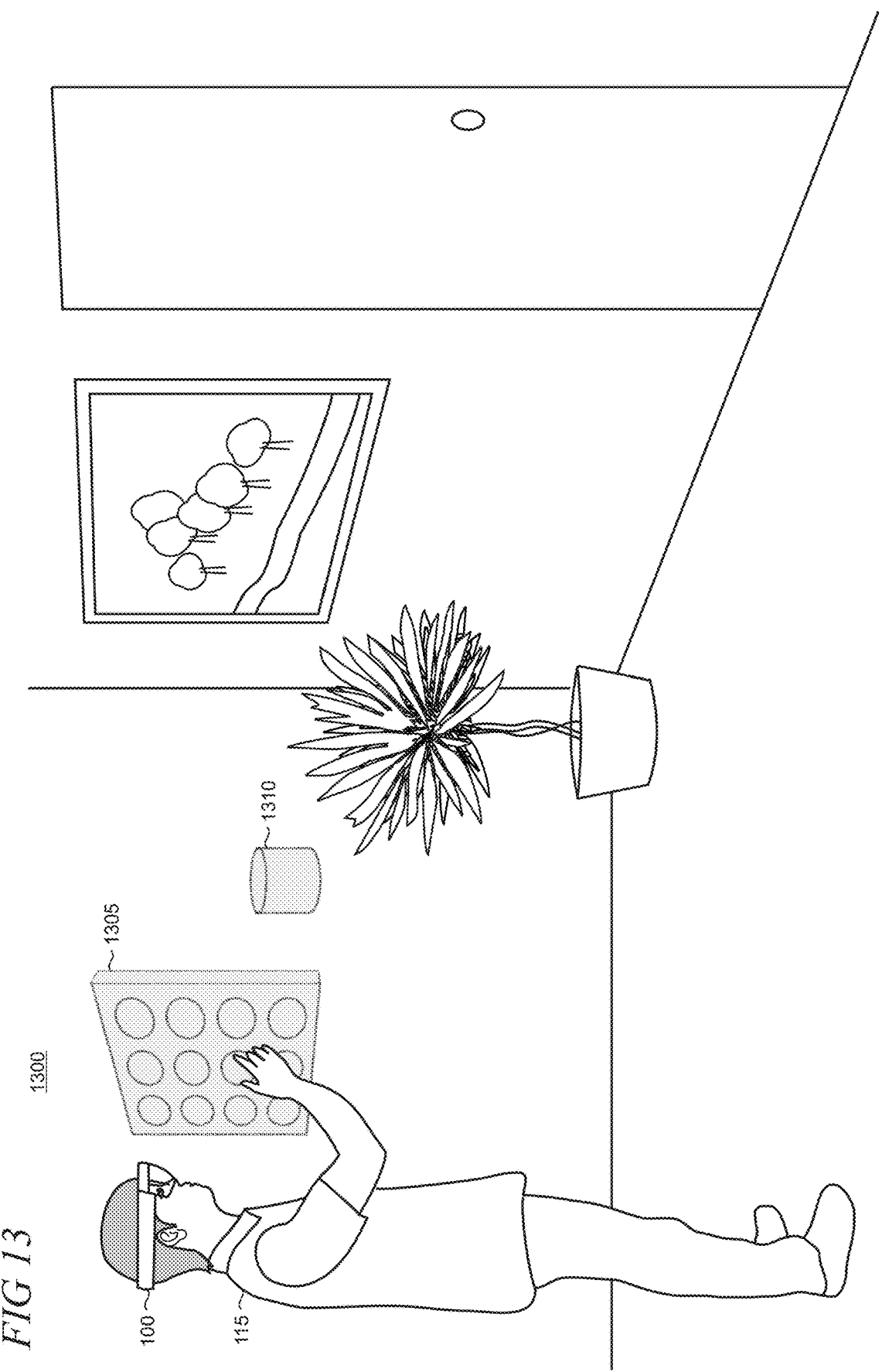
FIGS. 13 and 14 show an HMD user in a physical environment interacting with illustrative virtual objects.
Figure 14:
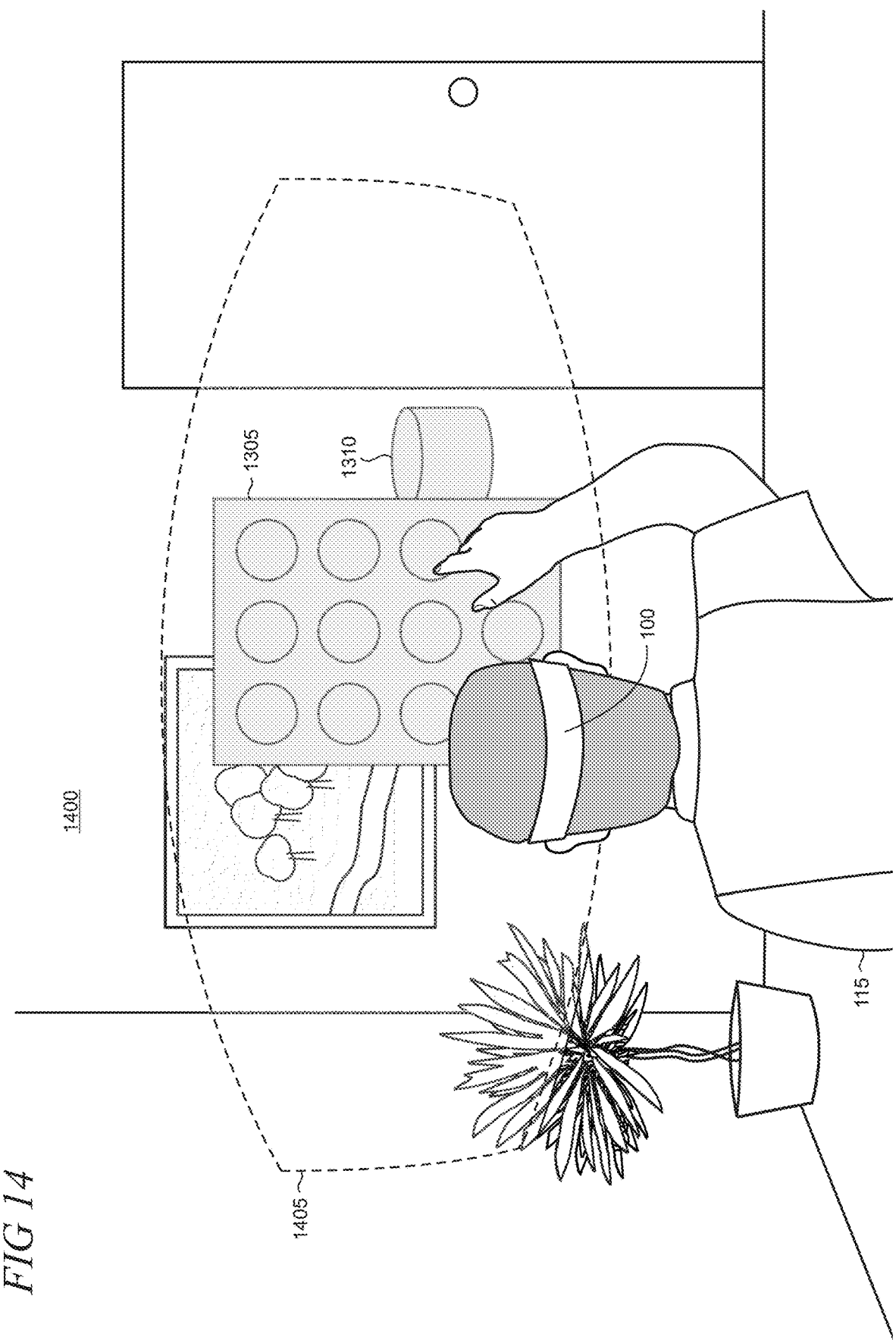

For example, FIG. 13 shows a user 115 interacting with various virtual objects 1305 and 1310 in a mixed-reality scene 1300 that occurs in a real-world office setting. It may be noted that the virtual objects shown in the drawing are ordinarily viewable only by HMD device users. FIG. 14 shows the mixed-reality scene from the perspective of the HMD device user within the FOV 1405 of the device. The panel virtual object 1305 is displayed in the near focal plane while cylindrical virtual object 1310 is displayed in the far focal plane. To maintain the natural appearance of depth, the virtual image source composes the mixed-reality scene, which is displayed at the different focal distances through operations of the FLC modulator and birefringent lens, to maintain the appropriate occlusion relationships between the objects in the scene. As shown in the mixed-reality scene 1400 in FIG. 14, the cylindrical virtual object 1310 is partially occluded by the panel virtual object 1305 in the user's FOV 1405. The virtual objects partially occlude the walls and contents of the room which are located beyond the far focal plane.

Figure 15:
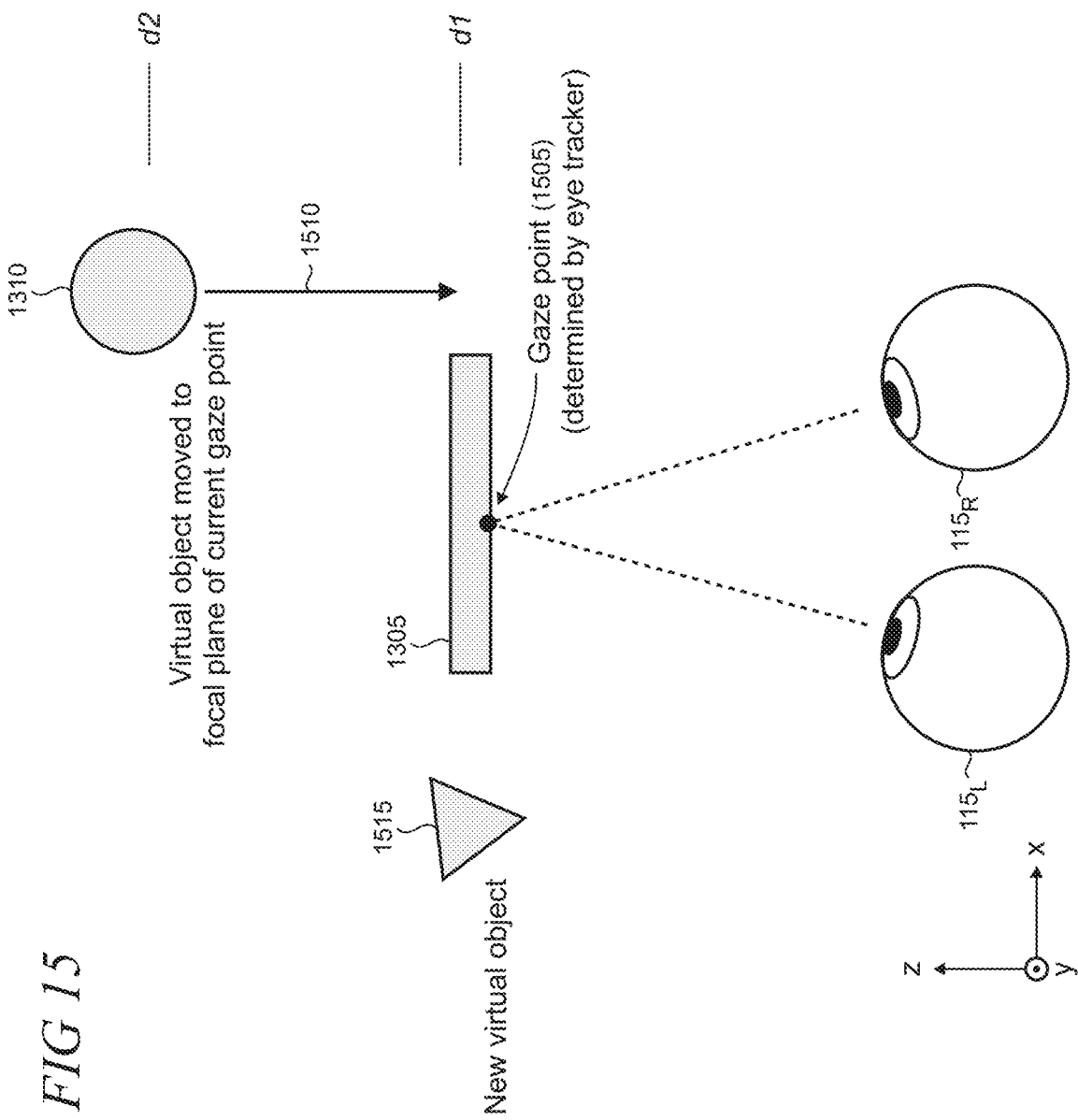
FIG. 15 depicts an illustrative arrangement in which some virtual objects are relocated to a focal plane containing a virtual object that an HMD device user is currently viewing.

FIG. 15 depicts a top view of an illustrative arrangement in which virtual objects may be located in a focal plane containing a virtual object that the HMD device user is currently viewing. It may be appreciated that rendering all virtual images in a single focal plane may reduce implementation complexity in some cases, for example, by lowering the refresh rate of components in the mixed-reality display system that would otherwise be needed to support distribution of virtual content across multiple focal planes simultaneously. VAC may also be reduced using a single focal plane for all virtual content.

As shown, a gaze point 1505 of the user 115 is determined by the eye tracker 1205 (FIG. 12) which indicates that the user is currently looking at the panel virtual object 1305 at distance d1. The cylindrical virtual object 1310 may then be moved from its current location at distance d2 to the same focal plane as the panel at distance d1, as indicated by line 1510. As images for new virtual objects are introduced into the composition of the mixed-reality scene, they can be rendered in the focal plane corresponding to the current gaze point. For example, a new triangular virtual object 1515 is located in the focal plane at distance d1. It may be appreciated that the focal plane controller 715 (FIG. 12) may be configured to continuously interact with the eye tracker 1205 such that virtual objects in the mixed-reality scene may be located and/or moved to the appropriate focal plane in response to detected shifts in the user's gaze point.

Figure 16:
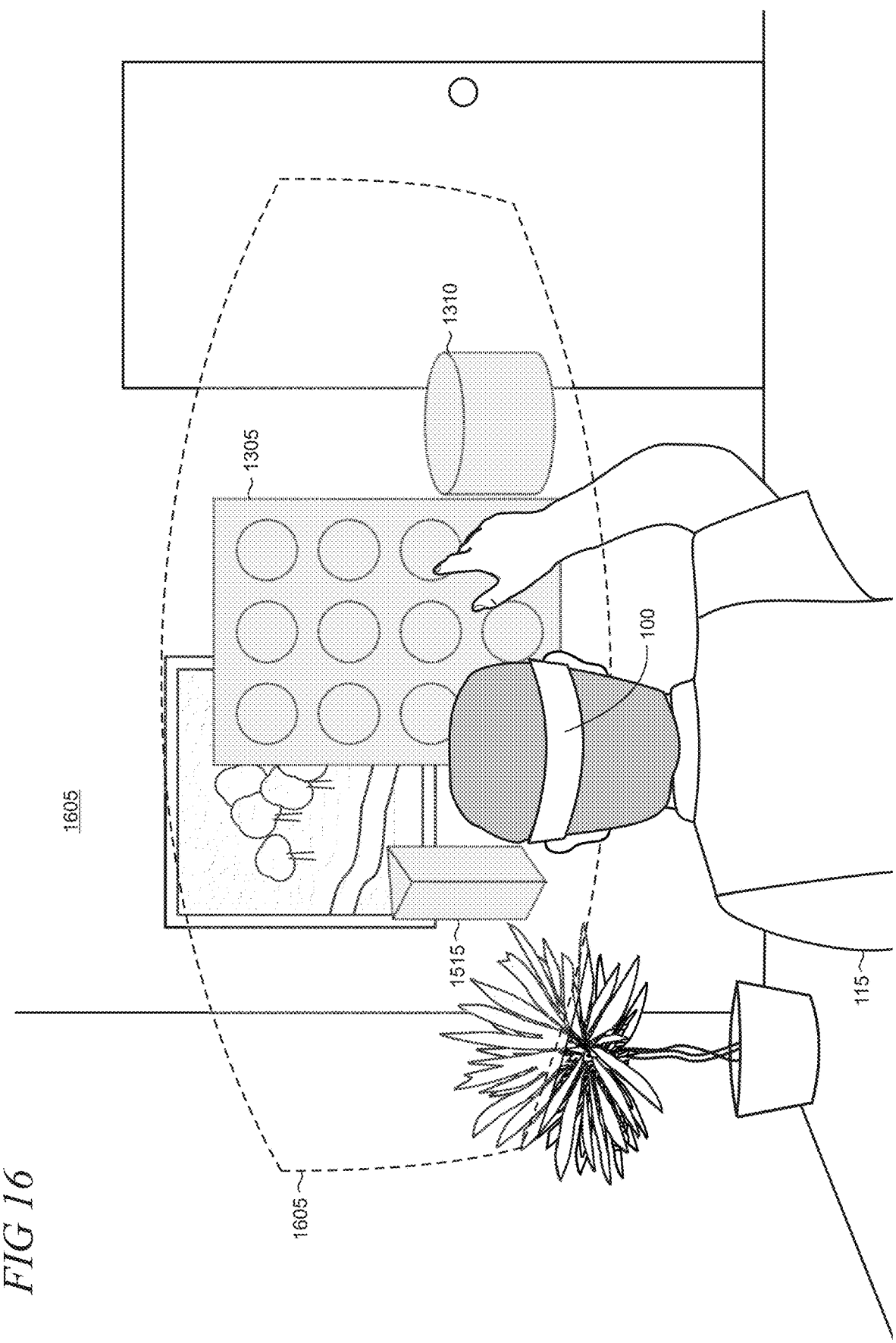
FIG. 16 shows an illustrative mixed-reality scene in which virtual objects are rendered in the same focal plane.

FIG. 16 shows an illustrative mixed-reality scene 1600, as discussed above with reference to FIG. 15, from the point of view of the HMD device user 115. As shown, all of the virtual objects 1515, 1305, and 1310 are located in a single focal plane which is selected based on the current gaze point of the user that is determined by operations of the eye tracker 1205 (FIG. 12). This mixed-reality scene 1600 thus differs from scene 1400 shown in FIG. 14 in which the panel and cylindrical virtual object are located at different focal planes at distances d1 and d2, respectively.

FIG. 17 is a flowchart of an illustrative method 1700 for operating an electronic device (e.g., an HMD device) that includes a mixed-reality see-through display system configured for showing mixed-reality scenes comprising virtual images of virtual-world objects that are rendered over views of real-world objects to a user of the electronic device. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1705, light for the virtual images is received, in which the light is linearly polarized in a first polarization state. At block 1710, an FLC modulator is operated to switch between the first polarization state for the virtual image light and a second polarization state that is orthogonal to the first polarization state. At block 1715, a lens of birefringent material is provided upon which virtual image light is incident in either the first polarization state or second polarization state, in which the lens provides one of two different focal distances for the virtual images depending on polarization state of the incident virtual image light. At block 1720, the virtual image light from the lens is in-coupled into the mixed-reality see-through optical display system which renders the virtual images at the one of two different focal distances to the user.

Figure 19:
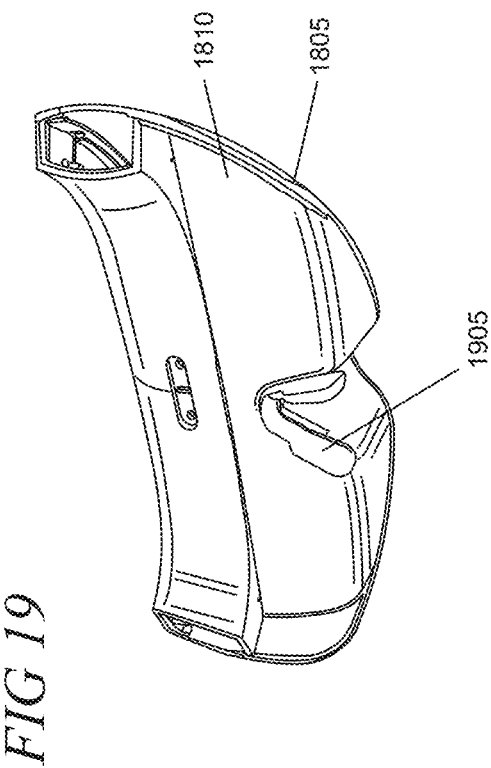
FIG. 19 shows a pictorial rear view of an illustrative sealed visor.
Figure 18:
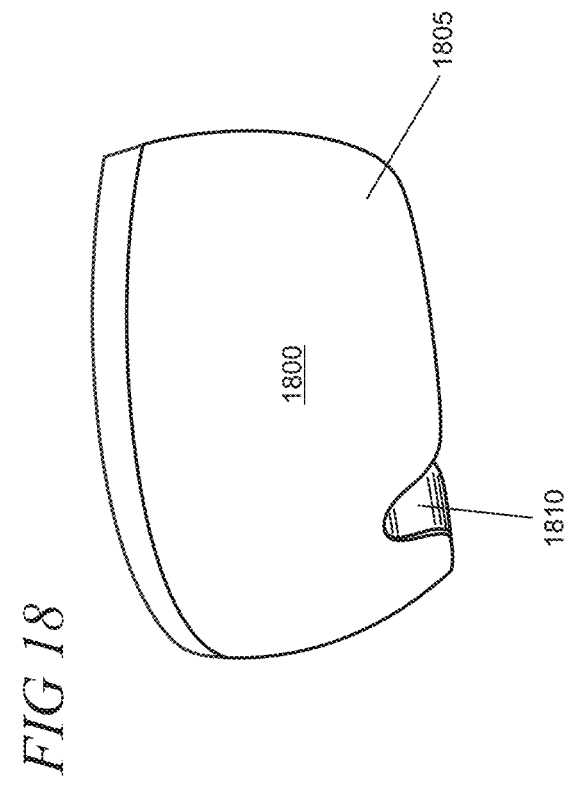
FIG. 18 shows a pictorial front view of an illustrative sealed visor that may be used as a component of an HMD device.

FIGS. 18 and 19 show respective front and rear views of an illustrative example of a visor 1800 that incorporates an internal near-eye display device 105 (FIGS. 1 and 2) that is used in the HMD device 100 as worn by a user 115. The visor, in some implementations, may be sealed to protect the internal display device. The visor typically interfaces with other components of the HMD device such as head-mounting/retention systems and other subsystems including sensors, power management, controllers, etc., as illustratively described in conjunction with FIGS. 22 and 23. Suitable interface elements (not shown) including snaps, bosses, screws and other fasteners, etc. may also be incorporated into the visor.

Figure 20:
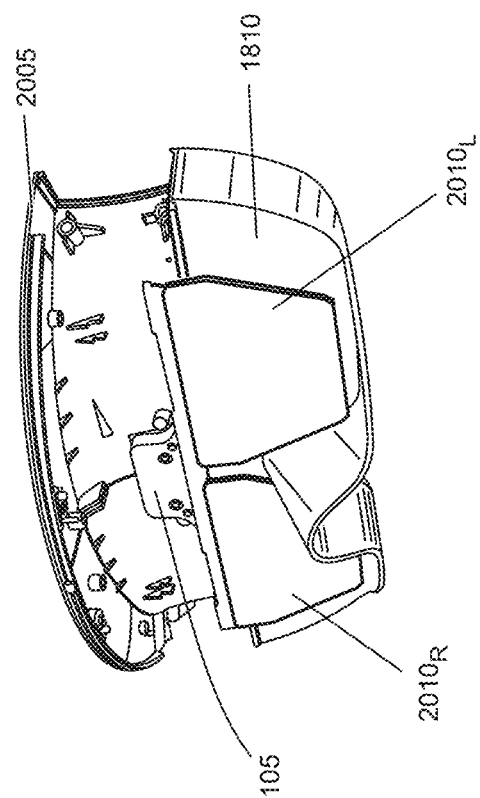
FIG. 20 shows a partially disassembled view of an illustrative sealed visor.

The visor 1800 may include see-through front and rear shields, 1805 and 1810 respectively, that can be molded using transparent or partially transparent materials to facilitate unobstructed vision to the display device and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 2005 shown in the disassembled view in FIG. 20.

The sealed visor 1800 can physically protect sensitive internal components, including a display device 105, when the HMD device is operated and during normal handling for cleaning and the like. The display device in this illustrative example includes left and right optical display systems 2010$_L$ and 2010$_R$ that respectively provide holographic virtual images to the user's left and right eyes for mixed-reality scenes. The visor can also protect the display device from environmental elements and damage should the HMD device be dropped or bumped, impacted, etc.

As shown in FIG. 19, the rear shield 1810 is configured in an ergonomically suitable form 1905 to interface with the user's nose, and nose pads and/or other comfort features can be included (e.g., molded-in and/or added-on as discrete components). In some applications, the sealed visor 1800 can also incorporate some level of optical diopter curvature (i.e., eye prescription) within the molded shields in some cases.

FIGS. 21A, 21B, and 21C are front, top, and side views, respectively, of an exemplary optical display system 2010 that can be used to replicate an image associated with an input pupil to an expanded exit pupil. The term input pupil refers to an aperture through which light corresponding to an image is overlaid on an input coupler 2105 that is disposed on a waveguide 2110. The term exit pupil refers to an aperture through which light corresponding to an image exits an output coupler 2115 that is disposed on the waveguide.

The waveguide 2110 can be made of glass or optical plastic but is not limited thereto. The opposite sides may be configured to be parallel. The waveguide may be planar, as illustratively shown, or in alternative embodiments, be curved. The waveguide may utilize a bulk substrate configuration in which the waveguide thickness is at least ten times the wavelengths of light for which the waveguide functions as a propagation medium. The waveguide is at least partially transparent to allow light to pass through it so that a user can look through the waveguide and observe an unaltered view of real-world objects on the other side.

An intermediate component 2120 may be disposed on the waveguide 2100 in some implementations. The intermediate component may be configured to redirect light in a direction of the output coupler 2115. Furthermore, the intermediate component may be configured to perform one of horizontal or vertical pupil expansion, and the output coupler may be configured to perform the other one of horizontal or vertical pupil expansion. For example, the intermediate component may perform pupil expansion in a horizontal direction, and the output coupler may perform pupil expansion in a vertical direction. Alternatively, if the intermediate component were repositioned, for example, to be below the input coupler and to the left of the output coupler 2115 shown in FIG. 21A, then the intermediate component can be configured to perform vertical pupil expansion, and the output coupler can be configured to perform horizontal pupil expansion.

The input coupler 2105, intermediate component 2120, and output coupler 2115 are shown as having rectangular outer peripheral shapes but can have alternative outer peripheral shapes. These elements can also be disposed on the same side of the waveguide, or on opposite sides. Embedded configurations may also be utilized in which one or more of the couplers or the component is immersed within the waveguide between its exterior surfaces. The input coupler, intermediate component, and output coupler may be configured using reflective optical elements each having one or more reflective or partially reflective surfaces. In alternative implementations, one or more diffractive optical elements may also be utilized to perform the input and output coupling and pupil expansion.

Figure 22:
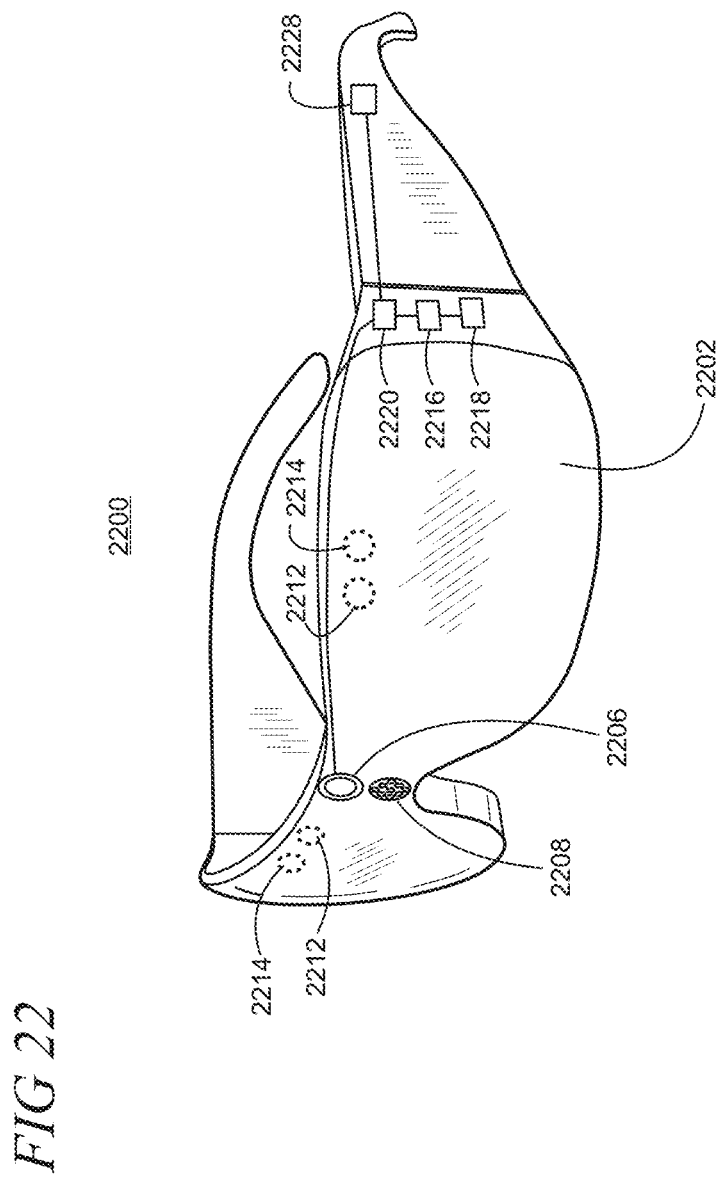
FIG. 22 is a pictorial view of an illustrative example of a virtual-reality or mixed-reality HMD device that may use the present combined birefringent material and reflective waveguide.
Figure 23:
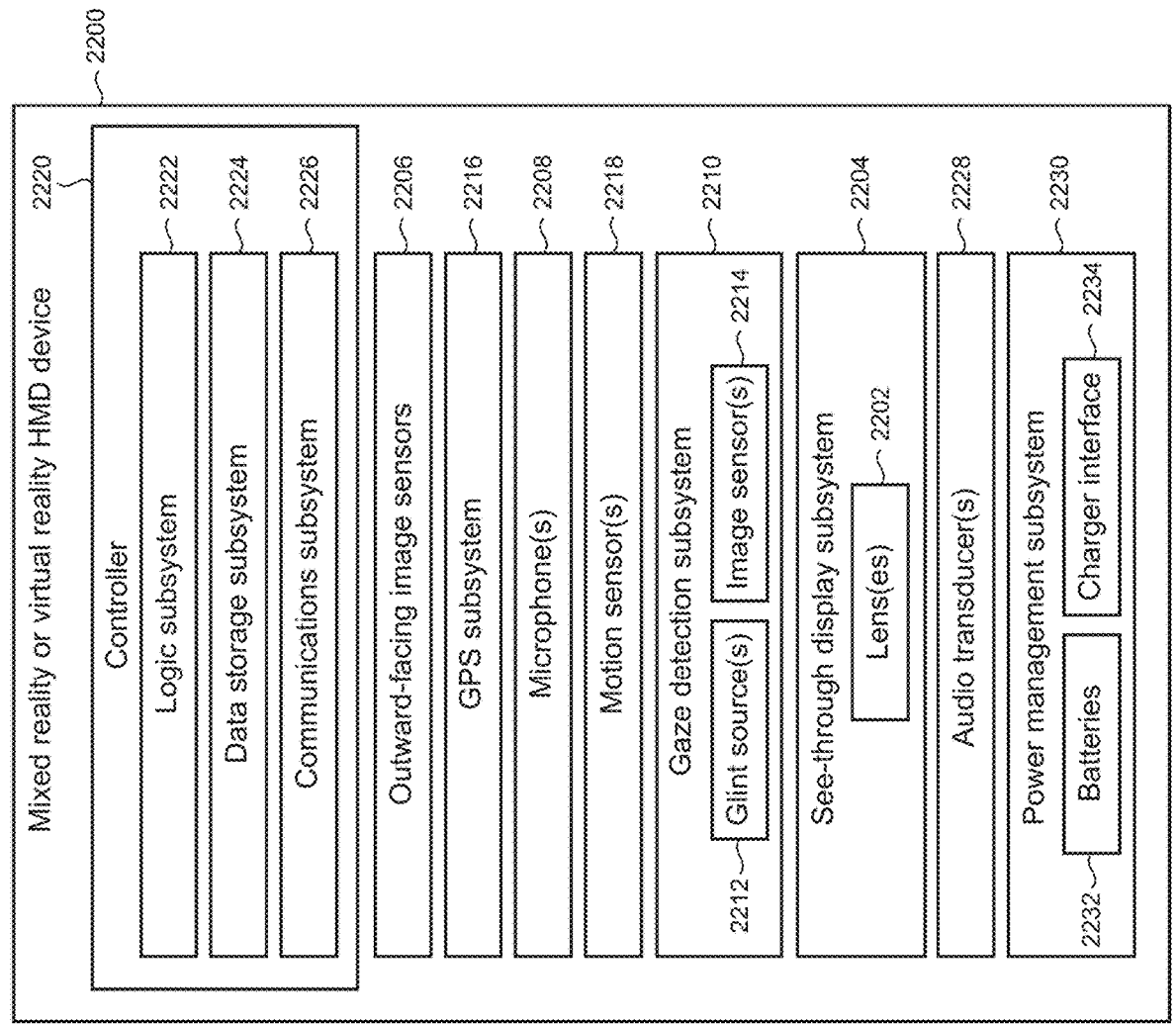
FIG. 23 shows a block diagram of an illustrative example of a virtual-reality or mixed-reality HMD device that may use the present combined birefringent material and reflective waveguide.

FIG. 22 shows one particular illustrative example of a mixed-reality HMD device 2200, and FIG. 23 shows a functional block diagram of the device 2200. The HMD device 2200 provides an alternative form factor to the HMD device 100 shown in the preceding drawings and discussed above. HMD device 2200 comprises one or more lenses 2202 that form a part of a see-through display subsystem 2204, so that images may be displayed using lenses 2202 (e.g., using projection onto lenses 2202, one or more waveguide systems, such as a near-eye display system, incorporated into the lenses 2202, and/or in any other suitable manner).

HMD device 2200 further comprises one or more outward-facing image sensors 2206 configured to acquire images of a background scene and/or physical environment being viewed by a user and may include one or more microphones 2208 configured to detect sounds, such as voice commands from a user. Outward-facing image sensors 2206 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 2200 may further include a gaze detection subsystem 2210 configured for detecting a direction of gaze of each eye of a user or a direction or location of focus, as described above. Gaze detection subsystem 2210 may be configured to determine gaze directions of each of a user's eyes in any suitable manner. For example, in the illustrative example shown, a gaze detection subsystem 2210 includes one or more glint sources 2212, such as virtual IR light or visible sources as described above, that are configured to cause a glint of light to reflect from each eyeball of a user, and one or more image sensors 2214, such as inward-facing sensors, that are configured to capture an image of each eyeball of the user. Changes in the glints from the user's eyeballs and/or a location of a user's pupil, as determined from image data gathered using the image sensor(s) 2214, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 2210 may have any suitable number and arrangement of light sources and image sensors. In some implementations, the gaze detection subsystem 2210 may be omitted.

The HMD device 2200 may also include additional sensors. For example, HMD device 2200 may comprise a global positioning system (GPS) subsystem 2216 to allow a location of the HMD device 2200 to be determined. This may help to identify real-world objects, such as buildings, etc., that may be located in the user's adjoining physical environment.

The HMD device 2200 may further include one or more motion sensors 2218 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 2206. The use of motion data may allow changes in gaze direction to be tracked even if image data from outward-facing image sensor(s) 2206 cannot be resolved.

In addition, motion sensors 2218, as well as microphone(s) 2208 and gaze detection subsystem 2210, also may be employed as user input devices, such that a user may interact with the HMD device 2200 via gestures of the eye, neck and/or head, as well as via verbal commands in some cases. It may be understood that sensors illustrated in FIGS. 22 and 23 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2200 can further include a controller 2220 such as one or more processors having a logic subsystem 2222 and a data storage subsystem 2224 in communication with the sensors, gaze detection subsystem 2210, display subsystem 2204, and/or other components through a communications subsystem 2226. The communications subsystem 2226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2224 may include instructions stored thereon that are executable by logic subsystem 2222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2200 is configured with one or more audio transducers 2228 (e.g., speakers, earphones, etc.) so that audio can be utilized as part of a mixed-reality or virtual-reality experience. A power management subsystem 2230 may include one or more batteries 2232 and/or protection circuit modules (PCMs) and an associated charger interface 2234 and/or remote power interface for supplying power to components in the HMD device 2200.

It may be appreciated that the HMD device 2200 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 24:
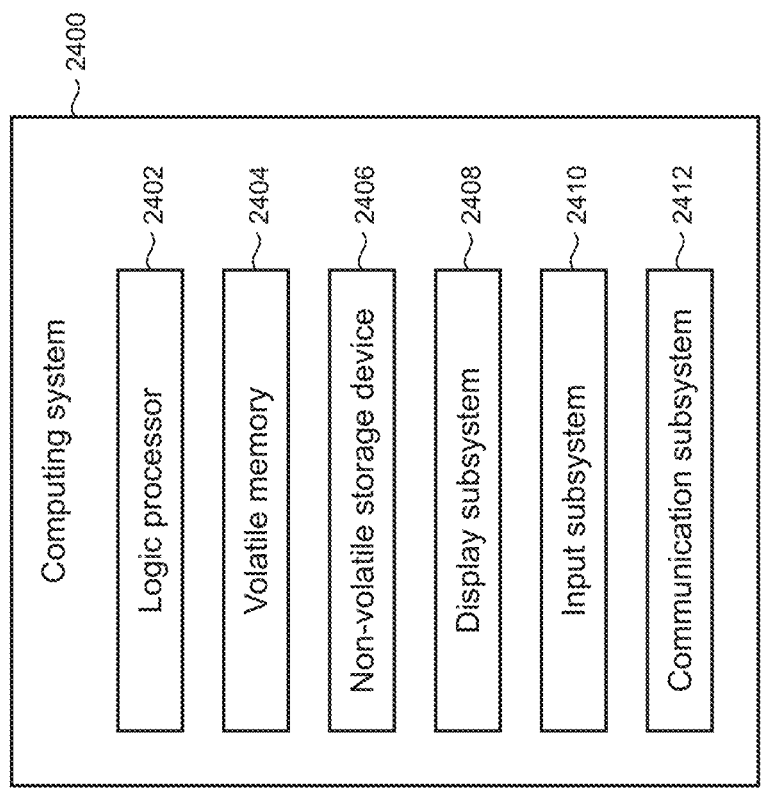
FIG. 24 schematically shows an illustrative example of a computing system that can enact one or more of the methods and processes described herein with respect to the present combined birefringent material and reflective waveguide.

FIG. 24 schematically shows an illustrative example of a computing system that can enact one or more of the methods and processes described above for the present combined birefringent material and reflective waveguide. Computing system 2400 is shown in simplified form. Computing system 2400 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 2400 includes a logic processor 2402, volatile memory 2404, and a non-volatile storage device 2406. Computing system 2400 may optionally include a display subsystem 2408, input subsystem 2410, communication subsystem 2412, and/or other components not shown in FIG. 24.

Logic processor 2402 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. In addition, or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 2406 includes one or more physical devices configured to hold instructions executable by the logic processors to implement the methods and processes described herein. When such methods and processes are implemented, the state of non-volatile storage device 2406 may be transformed—e.g., to hold different data.

Non-volatile storage device 2406 may include physical devices that are removable and/or built-in. Non-volatile storage device 2406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 2406 may include nonvolatile, dynamic, static, read/write, read-only, sequential-access, location-addressable, file-addressable, and/or content-addressable devices. It will be appreciated that non-volatile storage device 2406 is configured to hold instructions even when power is cut to the non-volatile storage device 2406.

Volatile memory 2404 may include physical devices that include random access memory. Volatile memory 2404 is typically utilized by logic processor 2402 to temporarily store information during processing of software instructions. It will be appreciated that volatile memory 2404 typically does not continue to store instructions when power is cut to the volatile memory 2404.

Aspects of logic processor 2402, volatile memory 2404, and non-volatile storage device 2406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 2400 typically implemented in software by a processor to perform a particular function using portions of volatile memory, which function involves transformative processing that specially configures the processor to perform the function. Thus, a program may be instantiated via logic processor 2402 executing instructions held by non-volatile storage device 2406, using portions of volatile memory 2404. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 2408 may be used to present a visual representation of data held by non-volatile storage device 2406. This visual representation may take the form of a graphical user interface (GUI). As the herein described methods and processes change the data held by the non-volatile storage device, and thus transform the state of the non-volatile storage device, the state of display subsystem 2408 may likewise be transformed to visually represent changes in the underlying data. Display subsystem 2408 may include one or more display devices utilizing virtually any type of technology; however, one utilizing a MEMS projector to direct laser light may be compatible with the eye-tracking system in a compact manner. Such display devices may be combined with logic processor 2402, volatile memory 2404, and/or non-volatile storage device 2406 in a shared enclosure, or such display devices may be peripheral display devices.

When included, input subsystem 2410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2412 may be configured to communicatively couple various computing devices described herein with each other, and with other devices. Communication subsystem 2412 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2400 to send and/or receive messages to and/or from other devices via a network such as the Internet.

Various exemplary embodiments of the present combined birefringent material and reflective waveguide for multiple focal planes in a mixed-reality head-mounted display device are now presented by way of illustration and not as an exhaustive list of all embodiments. An example includes a method for operating an electronic device that includes a mixed-reality see-through optical display system configured for showing mixed-reality scenes comprising virtual images of virtual-world objects that are rendered over views of real-world objects to a user of the electronic device, the method comprising: receiving light for the virtual images, the light being linearly polarized in a first polarization state; operating a ferroelectric liquid crystal (FLC) modulator to switch between the first polarization state for the virtual image light and a second polarization state that is orthogonal to the first polarization state; providing a lens of birefringent material upon which virtual image light is incident in either the first polarization state or second polarization state, in which the lens provides one of two different focal distances for the virtual images depending on polarization state of the incident virtual image light; and in-coupling the virtual image light from the lens into the mixed-reality see-through optical display system which renders the virtual images at the one of two different focal distances to the user.

In another example, the method further comprises operating the FLC modulator at a rate that is synchronized to a refresh rate of the received virtual image light to provide a temporally multiplexed virtual image display comprising one or more virtual images located at either one or the other different focal distances or located at both of the different focal distances simultaneously. In another example, the method further comprises stacking combinations of FLC modulators and lenses of birefringent material that act on the received virtual image light in series, in which each combination in the stack provides two unique focal distances for the rendered virtual images. In another example, the method further comprises operating the FLC modulator according to a composition of a mixed-reality scene, in which the composed mixed-reality scene includes virtual-world objects that are located at different focal distances.

A further example includes a head-mounted display (HMD) device wearable by a user and configured for supporting a mixed-reality experience including viewing, by the user, of virtual images that are combined with views of real-world objects in a physical world, comprising: a focal-distance modulation system that is operable to receive virtual images from a virtual image source, the focal-distance modulation system comprising a polarization modulator and a birefringent lens, wherein the polarization modulator is configured to selectively switch polarization of the virtual images between two orthogonal states, and wherein the birefringent lens has two different refractive indices each with sensitivity to a different orthogonal state of polarization of virtual images, wherein virtual images in a first polarization state are focused by the birefringent lens at a first focal distance, and wherein virtual images in a second polarization state are focused by the birefringent lens at a second focal distance; and an optical combiner with which the user can see the real-world objects and the virtual images in a mixed-reality scene, the optical combiner including an input coupler configured to in-couple virtual images from the focal-distance modulation system that are focused at either the first or second focal distance into the optical combiner and further including an output coupler configured to out-couple the virtual images that are focused at either the first or second focal distance from the optical combiner to one or more of the user's eyes.

In another example, the HMD device further comprises a linear polarizing filter that is arranged to linearly polarize light from the virtual image source. In another example, the HMD device further comprises an eye tracker for tracking vergence of the user's eyes or tracking a gaze direction of at least one eye of the user to perform one of calibration of alignment between the user's eye and the optical combiner, dynamic determination of whether alignment changes during use of the HMD device, or composition of a mixed-reality scene at the virtual image source. In another example, the composition of the mixed-reality scene comprises rendering virtual images in a single focal plane that is selected based on operation of the eye tracker to determine a gaze point of the user. In another example, the HMD device further comprises a focal plane controller operatively coupled to the polarization modulator and configured to selectively switch the polarization state of the virtual images at a rate that is synchronized with a refresh rate of the virtual image source to generate virtual images at different focal distances in the mixed-reality scene supported by the optical combiner. In another example, the focal plane controller is further operatively coupled to the virtual image source and configured to selectively switch the polarization state of the virtual images based on a composition of a mixed-reality scene generated at the virtual image source. In another example, the focal-distance modulation system further comprises at least an additional polarization modulator and an additional birefringent lens wherein a total of N polarization modulator/birefringent lens pairs are utilized to provide $2^N$ different focal distances. In another example, the optical combiner comprises a waveguide that is at least partially transparent, the waveguide configured for guiding focused virtual images from the input coupler to the output coupler. In another example, one or more of the input coupler, output coupler, or waveguide include one or more reflective surfaces. In another example, the optical combiner is configured to provide an exit pupil that is expanded in one or more directions relative to an input pupil to the optical combiner. In another example, the polarization modulator comprises one of ferroelectric liquid crystal (FLC) modulator, photo-elastic modulator, electro-optic modulator, magneto-optic modulator, or piezoelectric modulator.

A further example includes a mixed-reality optical display system providing a plurality of different focal lengths for planes into which images of virtual-world objects are displayable, comprising: a source configured to generate light for virtual-world images, the virtual-world image light propagating on a light path from the source to an eye of a user of the mixed-reality display system; a ferroelectric liquid crystal (FLC) modulator disposed along the light path, and which is operatively coupled to the source to receive virtual-world image light, and which is switchable between first and second switched states; a linear polarizer disposed along the light path between the source and the FLC modulator and configured to impart a linearly polarized state to the virtual-world image light that is incident on the FLC modulator, wherein the switchable FLC modulator is configured as a half-wave plate that is aligned at zero degrees or 45 degrees with respect to a polarization axis of the linear polarizer depending on the switched state; a birefringent lens disposed along the light path downstream from the FLC modulator, the birefringent lens having an ordinary refractive index that is aligned with the polarization axis of the linear polarizer and an extraordinary refractive index that is orthogonal to the ordinary refractive index, wherein virtual-world image light incident on the birefringent lens having a state of polarization that is aligned with the ordinary refractive index is focused by the birefringent lens at a first focal length and virtual-world image light incident on the birefringent lens having a state of polarization that is aligned with the extraordinary refractive index is focused by the birefringent lens at a second focal length that is different from the first; a focal length controller operatively coupled to the FLC modulator to switch the FLC modulator between the first and the second states, wherein in the first switched state of the FLC modulator, virtual-world image light exiting the FLC modulator and incident on the birefringent lens has a state of polarization that is aligned with the ordinary refractive index of the birefringent lens, and wherein in the second switched state of the FLC modulator, virtual-world image light exiting the FLC modulator has a state of polarization that is aligned with the extraordinary refractive index of the birefringent lens; and a see-through optical combiner through which real-world objects are viewable by the user, the see-through optical combiner disposed on the light path downstream from the birefringent lens, and the see-through optical combiner being adapted to display the virtual-world object images which are superimposed over the views of real-world objects in first or second focal planes that are respectively associated with the first and second focal lengths.

In another example, the see-through optical combiner comprises a waveguide. In another example, the waveguide comprises a reflective input coupler or a reflective output coupler. In another example, the optical combiner is adapted to selectively display virtual-world object images in either or both the first and second planes according to operations of the focal length controller. In another example, the mixed-reality optical display system is configured for use in a head-mounted display (HMD) device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for operating an electronic device that includes a mixed-reality see-through optical display system configured for showing mixed-reality scenes comprising virtual images of virtual-world objects that are rendered over views of real-world objects to a user of the electronic device, the method comprising:
   receiving light for the virtual images, the light being linearly polarized in a first polarization state;
   operating a ferroelectric liquid crystal (FLC) modulator to switch between the first polarization state for the virtual image light and a second polarization state that is orthogonal to the first polarization state;
   providing a lens of birefringent material upon which virtual image light is incident in either the first polarization state or second polarization state, in which the lens provides one of two different focal distances for the virtual images depending on polarization state of the incident virtual image light;
   in-coupling the virtual image light from the lens into the mixed-reality see-through optical display system which renders the virtual images at the one of two different focal distances to the user;
   stacking combinations of FLC modulators and lenses of birefringent material that act on the received virtual image light in series, in which each combination in a stack of FLC modulators and lenses of birefringent material provides two unique focal distances for the rendered virtual images; and
   operating an FLC modulator at a rate that is synchronized to a refresh rate of the received virtual image light to provide a temporally multiplexed virtual image display comprising one or more virtual images located at either one or the other different focal distances or located at both of the different focal distances simultaneously,
   wherein the stack of combinations of FLC modulators and lenses of birefringent material are located on the electronic device outside the user's line of sight.

2. The method of claim 1 further comprising operating the FLC modulator according to a composition of a mixed-reality scene, in which the composed mixed-reality scene includes virtual-world objects that are located at different focal distances.

3. A head-mounted display (HMD) device wearable by a user and configured for supporting a mixed-reality experience including viewing, by the user, of virtual images that are combined with views of real-world objects in a physical world, comprising:
   a focal-distance modulation system that is operable to receive virtual images from a virtual image source, the focal-distance modulation system comprising first and second polarization modulators and first and second birefringent lenses, wherein the virtual images propagate in series through a stack comprising the first polarization modulator, the first birefringent lens, the second polarization modulator, and the second birefringent lens, wherein each polarization modulator is configured to selectively switch polarization of the virtual images between two orthogonal states, and wherein each birefringent lens has two different refractive indices each with sensitivity to a different orthogonal state of polarization of virtual images, wherein virtual images are focused by the first and second birefringent lenses at different focal distances in response to polarization state of the virtual images; and
   an optical combiner with which the user can see the real-world objects and the virtual images rendered in a mixed-reality scene, the optical combiner including an input coupler configured to in-couple virtual images from the focal-distance modulation system that are focused at either the first or second focal distance into the optical combiner and further including an output coupler configured to out-couple the virtual images that are focused at different focal distances from the optical combiner to one or more of the user's eyes;
   wherein the stack of first and second polarization modulators and first and second birefringent lenses are operable in the focal-distance modulation system to provide four unique focal distances for the rendered virtual images, and
   wherein the stack of first and second polarization modulators and first and second birefringent lenses are located on the HMD device outside the user's line of sight.

4. The HMD device of claim 3 further comprising a linear polarizing filter that is arranged to linearly polarize light from the virtual image source.

5. The HMD device of claim 3 further comprising an eye tracker for tracking vergence of the user's eyes or tracking a gaze direction of at least one eye of the user to perform one of calibration of alignment between the user's eye and the optical combiner, dynamic determination of whether alignment changes during use of the HMD device, or composition of a mixed-reality scene at the virtual image source.

6. The HMD device of claim 5 in which the composition of the mixed-reality scene comprises rendering virtual images in a single focal plane that is selected based on operation of the eye tracker to determine a gaze point of the user.

7. The HMD device of claim 6 further comprising a focal plane controller operatively coupled to the polarization modulator and configured to selectively switch the polarization state of the virtual images at a rate that is synchronized with a refresh rate of the virtual image source to generate virtual images at different focal distances in the mixed-reality scene supported by the optical combiner.

8. The HMD device of claim 7 in which the focal plane controller is further operatively coupled to the virtual image source and configured to selectively switch the polarization state of the virtual images based on a composition of a mixed-reality scene generated at the virtual image source.

9. The HMD device of claim 3 in which the focal-distance modulation system further comprises at least an additional polarization modulator and an additional birefringent lens wherein a total of N polarization modulator/birefringent lens pairs are utilized to provide $2^N$ different focal distances.

10. The HMD device of claim 3 in which the optical combiner comprises a waveguide that is at least partially transparent, the waveguide configured for guiding focused virtual images from the input coupler to the output coupler.

11. The HMD device of claim 10 in which one or more of the input coupler, output coupler, or waveguide include one or more reflective surfaces.

12. The HMD device of claim 3 in which the optical combiner is configured to provide an exit pupil that is expanded in one or more directions relative to an input pupil to the optical combiner.

13. The HMD device of claim 3 in which the polarization modulator comprises one of ferroelectric liquid crystal (FLC) modulator, photo-elastic modulator, electro-optic modulator, magneto-optic modulator, or piezoelectric modulator.

14. A mixed-reality optical display system providing a plurality of different focal lengths for planes into which images of virtual-world objects are displayable, comprising:
 a source configured to generate light for virtual-world images, the virtual-world image light propagating on a light path from the source to an eye of a user of the mixed-reality display system;
 first and second ferroelectric liquid crystal (FLC) modulators disposed along the light path, each of which is operatively coupled to the source to receive virtual-world image light, and each of which is switchable between first and second switched states;
 a linear polarizer disposed along the light path between the source and the first FLC modulator and configured to impart a linearly polarized state to the virtual-world image light that is incident on the FLC modulator, wherein each switchable FLC modulator is configured as a half-wave plate that is aligned at zero degrees or 45 degrees with respect to a polarization axis of the linear polarizer depending on the switched state;
 first and second birefringent lenses disposed along the light path downstream from the FLC modulator, each birefringent lens having an ordinary refractive index that is aligned with the polarization axis of the linear polarizer and an extraordinary refractive index that is orthogonal to the ordinary refractive index, wherein virtual-world image light incident on each birefringent lens having a state of polarization that is aligned with the ordinary refractive index is focused by the birefringent lens at a first focal length and virtual-world image light incident on each birefringent lens having a state of polarization that is aligned with the extraordinary refractive index is focused by each birefringent lens at a second focal length that is different from the first, wherein the first and second polarization modulators and first and second birefringent lenses are arranged in a stack through which the virtual-world image light propagates in series, the stack comprising the first polarization modulator, the first birefringent lens, the second polarization modulator, and the second birefringent lens;
 a focal length controller operatively coupled to the pair of FLC modulators to switch each FLC modulator between the first and the second states, wherein in the first switched state of each FLC modulator, virtual-world image light exiting each FLC modulator and incident on the birefringent lens has a state of polarization that is aligned with the ordinary refractive index of the birefringent lens, and wherein in the second switched state of the FLC modulator, virtual-world image light exiting the FLC modulator has a state of polarization that is aligned with the extraordinary refractive index of the birefringent lens; and
 a see-through optical combiner through which real-world objects are viewable by the user, the see-through optical combiner disposed on the light path downstream from the birefringent lens, and the see-through optical combiner being adapted to display the virtual-world object images which are superimposed over the views of real-world objects in first or second focal planes that are respectively associated with the first and second focal lengths;
 wherein the stack of first and second polarization modulators and first and second birefringent lenses are operable by the focal length controller to provide four unique focal distances for the rendered virtual images, and
 wherein the stack of first and second polarization modulators and first and second birefringent lenses are located on the HMD device outside the user's line of sight.

15. The mixed-reality optical display system of claim 14 in which the see-through optical combiner comprises a waveguide.

16. The mixed-reality optical display system of claim 15 in which the waveguide comprises a reflective input coupler or a reflective output coupler.

17. The mixed-reality optical display system of claim 14 in which the optical combiner is adapted to selectively display virtual-world object images in either or both the first and second planes according to operations of the focal length controller.

18. The mixed-reality optical display system of claim 14 as configured for use in a head-mounted display (HMD) device.

* * * * *